(12) United States Patent
Chen

(10) Patent No.: US 10,609,190 B2
(45) Date of Patent: Mar. 31, 2020

(54) MOBILE TERMINAL

(71) Applicant: GUANGDONG OPPO MOBILE TELECOMMUNICATIONS CORP., LTD., Dongguan, Guangdong (CN)

(72) Inventor: Jia Chen, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/281,871

(22) Filed: Feb. 21, 2019

(65) Prior Publication Data

US 2019/0342432 A1 Nov. 7, 2019

(30) Foreign Application Priority Data

May 4, 2018 (CN) .......................... 2018 1 0421762
May 4, 2018 (CN) ..................... 2018 2 0676697 U

(51) Int. Cl.
*H04M 1/02* (2006.01)
*H04W 88/02* (2009.01)
(Continued)

(52) U.S. Cl.
CPC ........ *H04M 1/0235* (2013.01); *G06F 1/1686* (2013.01); *H04M 1/02* (2013.01);
(Continued)

(58) Field of Classification Search
CPC .... H04M 1/02; H04M 1/0235; H04M 1/0264; H04M 1/0206; H04M 1/0249;
(Continued)

(56) References Cited

U.S. PATENT DOCUMENTS

2005/0014527 A1 1/2005 Chambers et al.
2006/0261257 A1 11/2006 Hwang
(Continued)

FOREIGN PATENT DOCUMENTS

CN 105554200 A 5/2016
CN 106790801 A 5/2017
(Continued)

OTHER PUBLICATIONS

International search report, PCT/CN2019/075086, dated Apr. 19, 2019 (4 pages).
Extended European search report, EP19155454, dated Apr. 3, 2019 (8 pages).

*Primary Examiner* — Meless N Zewdu
(74) *Attorney, Agent, or Firm* — Ladas & Parry, LLP

(57) ABSTRACT

The present disclosure provides a mobile terminal. The mobile terminal includes a support assembly, a display screen, and a moveable seat. The support assembly includes a first housing, a second housing, and a bendable member. The bendable member is connected between the first housing and the second housing. The first housing is provided with a protrusion. The first housing defines an accommodation slot therein. The second housing is provided with a concave groove. When the support assembly is folded, at least a part of the protrusion is accommodated within the concave groove. A camera is disposed in the moveable seat. The moveable seat is retractably mounted in the accommodation slot, and the moveable seat carrying the camera is configured to be received within the accommodation slot or extended out of the accommodation slot so that an image capturing face of the camera is exposed.

20 Claims, 14 Drawing Sheets

(51) Int. Cl.
*H04M 1/26* (2006.01)
*G06F 1/16* (2006.01)

(52) U.S. Cl.
CPC ....... *H04M 1/0206* (2013.01); *H04M 1/0264* (2013.01); *H04M 1/0266* (2013.01); *H04M 1/26* (2013.01); *H04W 88/02* (2013.01)

(58) Field of Classification Search
CPC ............. H04M 1/0252; H04M 1/0247; H04M 1/0214; H04M 1/022; H04M 1/0222; H04M 1/0266; H04M 1/0268; H04M 2250/16; H04M 2250/20; H04M 1/00; H04M 1/0216; H04M 1/0233; H04M 1/0295; H04M 1/0225; H04M 1/0208; H04M 1/021; H04M 1/0243; H04W 88/02; H04W 92/08; G06F 1/1686; G06F 1/1616; G06F 1/1641; G06F 1/1637; G06F 1/16; G06F 1/1601
See application file for complete search history.

(56) References Cited

U.S. PATENT DOCUMENTS

| | | | |
|---|---|---|---|
| 2007/0076118 A1* | 4/2007 | Chiang | 348/375 |
| 2009/0137268 A1* | 5/2009 | Fukazawa et al. | 455/556.1 |
| 2009/0161004 A1 | 6/2009 | Yuan | |
| 2010/0234073 A1* | 9/2010 | Kusano | 455/566 |
| 2011/0237310 A1* | 9/2011 | Sugimori et al. | 455/575.1 |
| 2012/0293683 A1* | 11/2012 | Osaka et al. | 348/222.1 |
| 2019/0014247 A1* | 1/2019 | Brand et al. | H04N 5/232 |

FOREIGN PATENT DOCUMENTS

| | | |
|---|---|---|
| CN | 106850896 A | 6/2017 |
| CN | 107528940 A | 12/2017 |
| EP | 2720140A1 A1 | 4/2014 |

* cited by examiner

MOBILE TERMINAL

CROSS-REFERENCE TO RELATED APPLICATIONS

This application claims priorities to Chinese Patent Application Nos. 201820676697.8 and 201810421762.7, all filed on May 4, 2018, the contents of which are herein incorporated by reference in their entireties.

FIELD

The described embodiments relate to a technical field of mobile terminals.

BACKGROUND

Nowadays, in order to obtain better using experience, demands for large-screen displaying by users are increasing rapidly. However, components such as a camera or the like also need to be arranged on a front face of a mobile phone, and those components limit an arrangement space of a display screen, so it is difficult to improve a screen-to-body ratio of the mobile phone.

SUMMARY

An embodiment of the present disclosure provides a mobile terminal. The mobile terminal may include a support assembly, a display screen, and a moveable seat. The support assembly includes a first housing, a second housing, and a bendable member. The bendable member is connected between the first housing and the second housing. The bendable member is capable of being spread or bent so as to spread out or fold the support assembly. The first housing includes a first inner face, a first outer face and a first peripheral face. The first outer face supports the display screen. The first inner face is disposed opposite to the first outer face. The first peripheral face is connected between the first inner face and the first outer face. The first housing is provided with a protrusion. The protrusion protrudes from the first inner face. The first housing defines an accommodation slot therein. The accommodation slot is at least partially defined in the protrusion, and the accommodation slot extends from an inside of the first housing to the first peripheral face. The second housing includes a second inner face and a second outer face. The second outer face supports the display screen. The second inner face is disposed opposite to the second outer face. The second housing is provided with a concave groove. When the support assembly is folded, the second inner face is disposed opposite to the first inner face, at least a part of the protrusion is accommodated within the concave groove, and a projection of the concave groove on the first inner face covers a projection of the accommodation slot on the first inner face. A camera is disposed in the moveable seat. The moveable seat is retractably mounted in the accommodation slot, and the moveable seat carrying the camera is configured to be received within the accommodation slot or extended out of the accommodation slot so that an image capturing face of the camera is exposed.

Another embodiment of the present disclosure provides a mobile terminal. The mobile terminal may include a support assembly, a display screen, and a moveable seat. The support assembly includes a first housing, a second housing, and a bendable member. The bendable member is connected between the first housing and the second housing. The first housing includes a first inner face, a first outer face and a first top face; the first outer face partially supports the display screen, the first inner face is disposed opposite to the first outer face, the first top face is connected between the first inner face and the first outer face, the first housing is provided with a protrusion, the protrusion protrudes from the first inner face, the first housing defines an accommodation space therein, the accommodation space is at least partially defined in the protrusion, and the accommodation space extends from an inside of the first housing to the first top face. The second housing includes a second inner face and a second outer face, the second outer face partially supports the display screen, the second inner face is disposed opposite to the second outer face, the second housing is provided with a concave groove; when bendable member is bent to fold the support assembly, the second inner face is disposed opposite to the first inner face, at least a part of the protrusion is accommodated within the concave groove. A camera is carried by the moveable seat, the moveable seat is retractably mounted in the accommodation space, and the moveable seat carrying the camera is configured to be received within the accommodation space or extended out of the accommodation space so that an image capturing face of the camera is exposed.

Another embodiment of the present disclosure provides a mobile terminal. The mobile terminal may include a support assembly, a display screen, and a moveable seat. The support assembly includes a first housing, a second housing, and a bendable member; the bendable member is connected between the first housing and the second housing, the first housing and the second housing support the display screen. The first housing is provided with a protrusion, the first housing defines an accommodation slot therein, and the accommodation slot is at least partially defined in the protrusion. The second housing is provided with a concave groove; when the support assembly is folded, at least a part of the protrusion is accommodated within the concave groove. A camera is disposed in the moveable seat, the moveable seat is retractably mounted in the accommodation slot, and the moveable seat carrying the camera is configured to be received within the accommodation slot or extended out of the accommodation slot so that an image capturing face of the camera is exposed.

BRIEF DESCRIPTION OF THE DRAWINGS

In order to clearly illustrate the technical solutions of the present disclosure, the drawings used in the description of the embodiments will be briefly described. It is understood that the drawings described herein are merely some embodiments of the present disclosure. Those skilled in the art may derive other drawings from these drawings without inventive effort.

DETAILED DESCRIPTION

Figure 1:
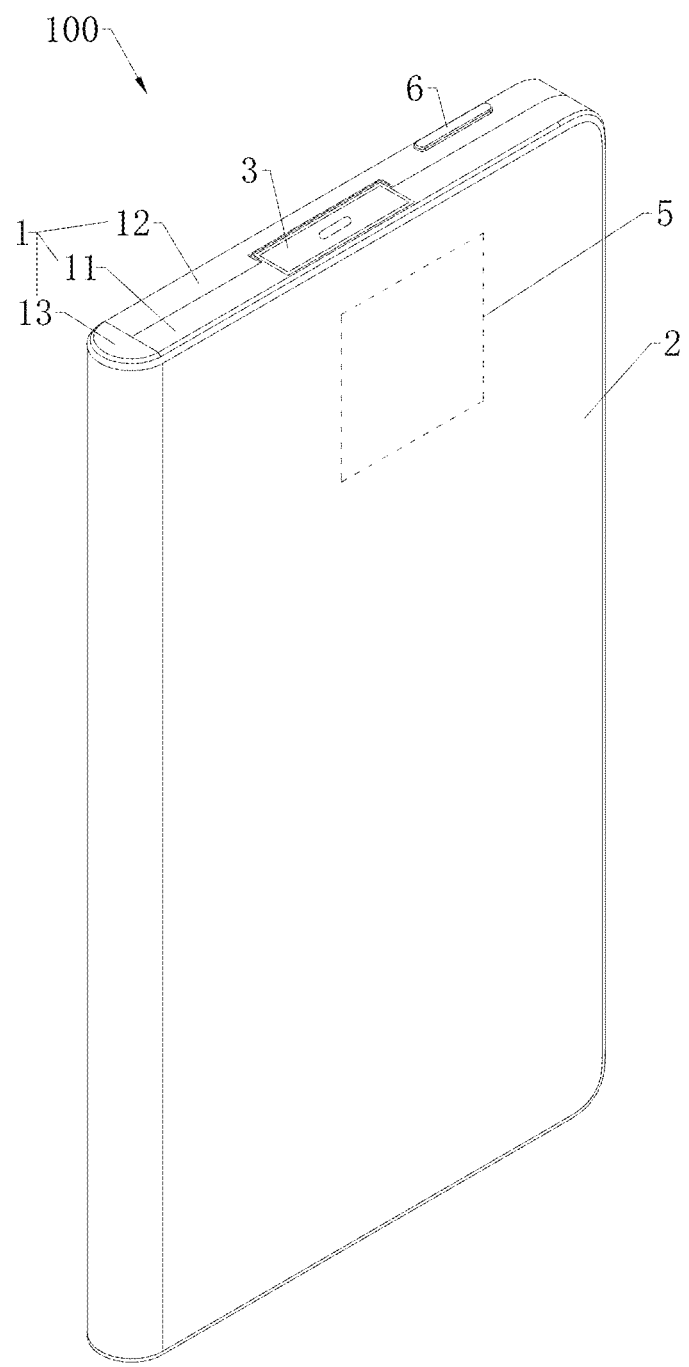
FIG. 1 is a schematic structural view of a mobile terminal in a folded state that is provided according to an embodiment of this application.

The detailed description set forth below is intended as a description of the subject technology with reference to the appended figures and embodiments. It is understood that the embodiments described herein include merely some parts of the embodiments of the present disclosure, but do not include all the embodiments. Based on the embodiments of the present disclosure, all other embodiments that those skilled in the art may derive from these embodiments are within the scope of the present disclosure.

In the description of the present disclosure, it is to be understood that terms such as "upper", "lower", "front", "rear", "left", "right", "inner", "outer", "side", and the like, refer to the orientations and locational relations illustrated in the accompanying drawings. Thus, these terms used here are only for describing the present disclosure and for describing in a simple manner, and are not intended to indicate or imply that the device or the elements are disposed to locate at the specific directions or are structured and performed in the specific directions, which could not to be understood as limiting the present disclosure.

In the present disclosure, unless specified or limited, otherwise, terms "mounted", "connected", "coupled", "disposed on", and the like are used in a broad sense, and may include, for example, fixed connections, detachable connections, or integral connections; may also be mechanical or electrical connections; may also be direct connections or indirect connections via intervening structures; may also be inner communications of two elements, as can be understood by one skilled in the art depending on specific contexts.

Furthermore, in the description of the present disclosure, the term "a plurality of" means two or more than two, unless specified otherwise. If a term "process" appears in the specification, the term refers not only to an independent process, but also to other processes that cannot be clearly distinguished, as long as the desired effect of the "process" can be achieved. Moreover, the numerical range indicated by "~" in the present specification refers to a range in which the values in front of and in behind of the symbol "~" are included as the minimum and maximum values, respectively. In the accompanying drawings, the same or similar structures are denoted by same reference numerals.

In the present application, a communication terminal configured to communicate via a wireless interface may be referred to as a "wireless communication terminal", "wireless terminal", or "mobile terminal". The "communication terminal" (also referred to as "terminal") used herein includes, but is not limited to, a device that is configured to receive/transmit communication signals via a wire line connection, such as via a public-switched telephone network (PSTN), digital subscriber line (DSL), digital cable, a direct cable connection, and/or another data connection/network, and/or via a wireless interface with, for example, a cellular network, a wireless local area network (WLAN), a digital television network such as a DVB-H network, a satellite network, an AM-FM broadcast transmitter, and/or another communication terminal. A communication terminal that is set to communicate over a wireless interface may be referred to as a "wireless communication terminal", "wireless terminal" and/or "mobile terminal". Examples of the mobile terminal include, but are not limited to, a satellite or cellular radiotelephone; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver.

The present disclosure relates to a mobile terminal. The mobile terminal may include a support assembly, a display screen, and a moveable seat. The support assembly includes a first housing, a second housing, and a bendable member. The bendable member is connected between the first housing and the second housing. The bendable member is capable of being spread or bent so as to spread out or fold the support assembly. The first housing includes a first inner face, a first outer face and a first peripheral face. The first outer face supports the display screen. The first inner face is disposed opposite to the first outer face. The first peripheral face is connected between the first inner face and the first outer face. The first housing is provided with a protrusion. The protrusion protrudes from the first inner face. The first housing defines an accommodation slot therein. The accommodation slot is at least partially defined in the protrusion, and the accommodation slot extends from an inside of the first housing to the first peripheral face. The second housing includes a second inner face and a second outer face. The second outer face supports the display screen. The second inner face is disposed opposite to the second outer face. The second housing is provided with a concave groove. When the support assembly is folded, the second inner face is disposed opposite to the first inner face, at least a part of the protrusion is accommodated within the concave groove, and a projection of the concave groove on the first inner face covers a projection of the accommodation slot on the first inner face. A camera is disposed in the moveable seat. The moveable seat is retractably mounted in the accommodation slot, and the moveable seat carrying the camera is configured to be received within the accommodation slot or extended out of the accommodation slot so that an image capturing face of the camera is exposed.

In at least one embodiment, the first peripheral face includes an open face. An opening of the accommodation slot is partially formed on the open face, and the moveable seat is extended out of or retracted into the open face via the opening of the accommodation slot. The first peripheral face includes a first top side face, a first bottom side face and a first lateral side face, the first top side face is disposed opposite to the first bottom side face, the first lateral side face is connected between the first top side face and the first bottom side face, and the open face is one of the first top side face, the first bottom side face and the first lateral side face.

In at least one embodiment, the protrusion includes a first outer side wall, an orientation of the first outer side wall is consistent with an orientation of the open face, and the opening of the accommodation slot is partially formed on the first outer side wall.

In at least one embodiment, the first outer side wall is level with the open face, or the first outer side wall and the open face are disposed with an interval therebetween.

In at least one embodiment, wherein the second housing further includes a second peripheral face. The second peripheral face is connected between the second inner face and the second outer face, the concave groove extends to the second peripheral face, a part of the opening of the concave groove is formed on the second peripheral face. When the support assembly is folded, the opening of the concave groove is partially overlapped with the opening of the accommodation slot.

In at least one embodiment, the protrusion further includes a second outer side wall and a third outer side wall. The second outer side wall and the third outer side wall are disposed opposite to each other and are respectively connected with two ends of the first outer side wall. When the protrusion is accommodated within the concave groove, the second outer side wall and the third outer side wall form interference fit with a wall of the concave groove.

In at least one embodiment, the support assembly further includes a first locking member and a second locking member. The first locking member is disposed on the first housing, the second locking member is disposed on the second housing. When the support assembly is folded, the first locking member cooperates with the second locking member.

In at least one embodiment, the first locking member is a first permanent magnet, the second locking member is a second permanent magnet. When the support assembly is folded, the first permanent magnet and the second permanent magnet are magnetically attractive to each other.

In at least one embodiment, the first locking member is disposed on an outer side wall of the protrusion, and the second locking member is disposed on a wall of the concave groove.

In at least one embodiment, the first locking member is a latching block protruding from an outer side wall of the protrusion. The second locking member is a latching groove recessing from the wall of the concave groove. When the support assembly is folded, the latching block is engaged with the latching groove.

In at least one embodiment, the first locking member is a first limiting block protruding from an outer side wall of the protrusion. The second locking member is a second limiting block protruding from the wall of the concave groove. When the support assembly is folded, the first limiting block abuts against the second limiting block.

In at least one embodiment, the accommodation slot includes a first side wall and a second side wall disposed opposite to each other, and the moveable seat slideably connects with the first side wall and the second side wall so as to slide out of or slide into the accommodation slot.

In at least one embodiment, a wall of the accommodation slot is arc-shaped, an outer side wall of the movable base is arc-shaped, the outer side wall of the moveable seat is disposed opposite to the wall of the accommodation slot, and the moveable seat is rotatably connected to the first housing to rotate out of or rotate into the accommodation slot.

In at least one embodiment, the accommodation slot is semicircular, the moveable seat is semicircular or fan-shaped, and a rotating center of the moveable seat coincides with a center of circle of the accommodation slot.

In at least one embodiment, the moveable seat is further provided with at least one of an iris recognition module, a human face recognition module, a flash light, a microphone, an earphone, a light sensor, and a fingerprint module.

In at least one embodiment, the display screen is a flexible display screen. The first outer face, an outer face of the bendable member and the second outer face together support the display screen.

In at least one embodiment, the display screen includes a first sub-display screen and a second sub-display screen. The first sub-display screen is laid on the first outer face, and the second sub-display screen is laid on the second outer face.

In at least one embodiment, an orientation of the image capturing face of the camera is consistent with that of the first outer face, or the orientation of the image capturing face of the camera is consistent with that of the first inner face.

In at least one embodiment, the display screen includes a first display region and a second display region. The first display region is overlapped with the first outer face, the second display region is overlapped with the second outer face. An orientation of the image capturing face of the camera is consistent with that of the first inner face. The mobile terminal further includes a controller, the controller is accommodated within the first housing or the second housing. The controller includes: a receiving unit, being configured to receive a photographing signal; a determining unit, being configured to determine whether the photographing signal indicates front-facing photographing or back-facing photographing; a switching unit, being configured to switch the first display region to display the photographing interface of the camera when the photographing signal indicates the back-facing photographing; and being configured to switch the second display region to display the photographing interface of the camera when the photographing signal indicates the front-facing photographing; and a driving unit, being configured to drive the movable base carrying the camera to extend out of the accommodation slot according to the photographing signal, and control the camera to capture images.

In at least one embodiment, the display screen includes a first display region and a second display region. The first display region is overlapped with the first outer face, the second display region is overlapped with the second outer face; an orientation of the image capturing face of the camera is consistent with that of the first outer face. The mobile terminal further includes a controller, the controller is accommodated within the first housing or the second housing. The controller includes: a receiving unit, being configured to receive a photographing signal; a determining unit, being configured to determine whether the photographing signal indicates front-facing photographing or back-facing photographing; a switching unit, being configured to switch the first display region to display the photographing interface of the camera when the photographing signal indicates the front-facing photographing; and being configured to switch the second display region to display the photographing interface of the camera when the photographing signal indicates the back-facing photographing; and a driving unit, being configured to drive the movable base carrying the camera to extend out of the accommodation slot according to the photographing signal, and control the camera to capture images.

The present disclosure further relates to a mobile terminal. The mobile terminal may include a support assembly, a display screen, and a moveable seat. The support assembly includes a first housing, a second housing, and a bendable member. The bendable member is connected between the first housing and the second housing. The first housing includes a first inner face, a first outer face and a first top face; the first outer face partially supports the display screen, the first inner face is disposed opposite to the first outer face, the first top face is connected between the first inner face and the first outer face, the first housing is provided with a protrusion, the protrusion protrudes from the first inner face, the first housing defines an accommodation space therein, the accommodation space is at least partially defined in the protrusion, and the accommodation space extends from an inside of the first housing to the first top face. The second housing includes a second inner face and a second outer face, the second outer face partially supports the display screen, the second inner face is disposed opposite to the second outer face, the second housing is provided with a concave groove; when bendable member is bent to fold the support assembly, the second inner face is disposed opposite to the first inner face, at least a part of the protrusion is accommodated within the concave groove. A camera is carried by the moveable seat, the moveable seat is retractably mounted in the accommodation space, and the moveable seat carrying the camera is configured to be received within the accommodation space or extended out of the accommodation space so that an image capturing face of the camera is exposed.

The present disclosure further relates to a mobile terminal. The mobile terminal may include a support assembly, a display screen, and a moveable seat. The support assembly includes a first housing, a second housing, and a bendable member; the bendable member is connected between the first housing and the second housing, the first housing and the second housing support the display screen. The first housing is provided with a protrusion, the first housing defines an accommodation slot therein, and the accommodation slot is at least partially defined in the protrusion. The second housing is provided with a concave groove; when the support assembly is folded, at least a part of the protrusion is accommodated within the concave groove. A camera is disposed in the moveable seat, the moveable seat is retractably mounted in the accommodation slot, and the moveable seat carrying the camera is configured to be received within the accommodation slot or extended out of the accommodation slot so that an image capturing face of the camera is exposed.

Figure 2:
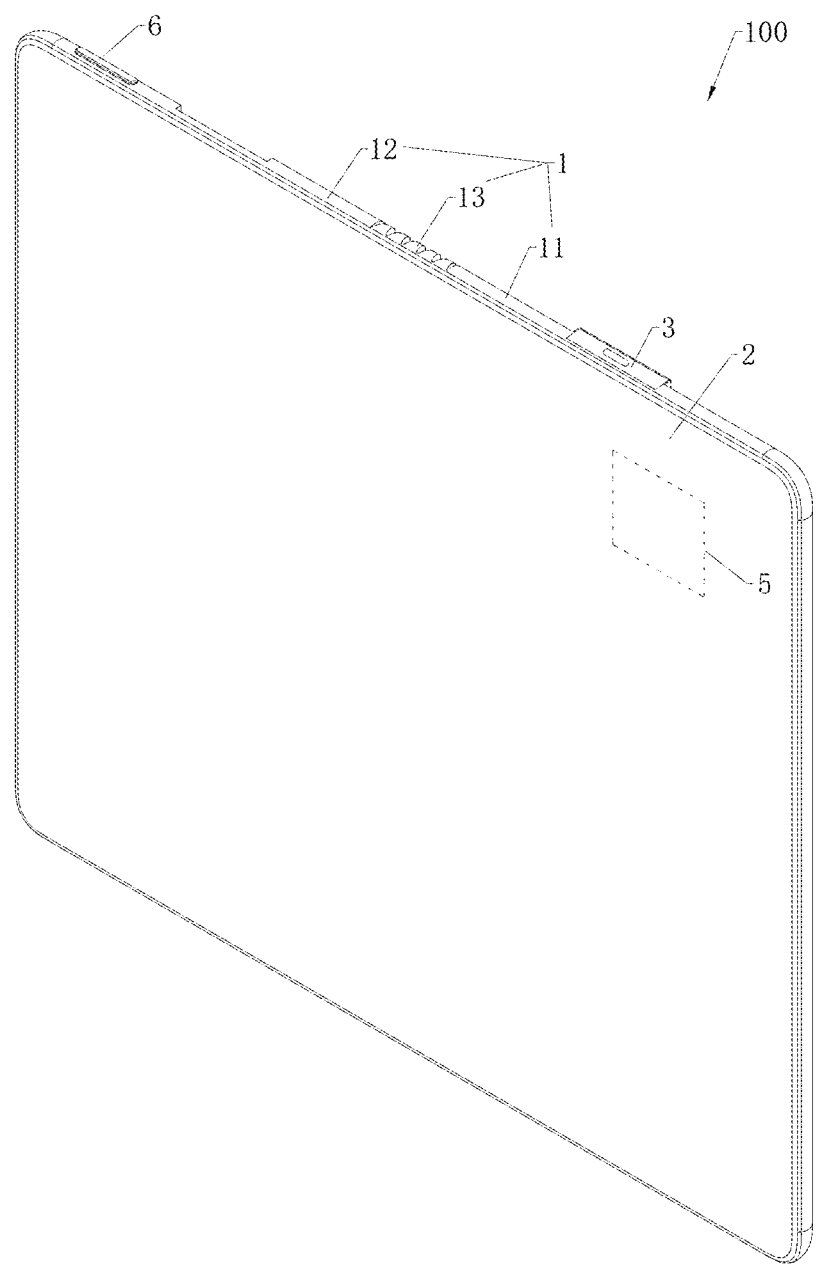
FIG. 2 is a schematic structural view of the mobile terminal of FIG. 1 in a spread state.

Referring to FIG. 1 and FIG. 2 together, an embodiment of the present disclosure provides a mobile terminal 100. The mobile terminal 100 includes a support assembly 1, a display screen 2, and a movable base 3. The display screen 2 is fixed to the support assembly 1. The support assembly 1 includes a first housing 11, a second housing 12, and a bendable member 13. The bendable member 13 is connected between the first housing 11 and the second housing 12. The bendable member 13 can be unfolded or bent to unfold or fold the support assembly 1. Herein, the bendable member 13 can include various implementations, such as an elastic plate structure, a hinge structure, a shaft connection structure, and the like.

In the present disclosure, when the support assembly 1 is in an unfolded state, the first housing 11 and the second housing 12 form an angle of 120° to 180°. As shown in FIG. 2, the present disclosure is described, taking the case as an example that an angle of 180° is formed between the first housing 11 and the second housing 12 when the support assembly 1 is unfolded. When the support assembly 1 is in a folded state, an angle of 0° to 15° is formed between the first housing 11 and the second housing 12. As shown in FIG. 1, the present disclosure is described, taking the case as an example that an angle of 0° between the first housing 11 and the second housing 12 is formed, when the support assembly 1 is folded.

Figure 3:
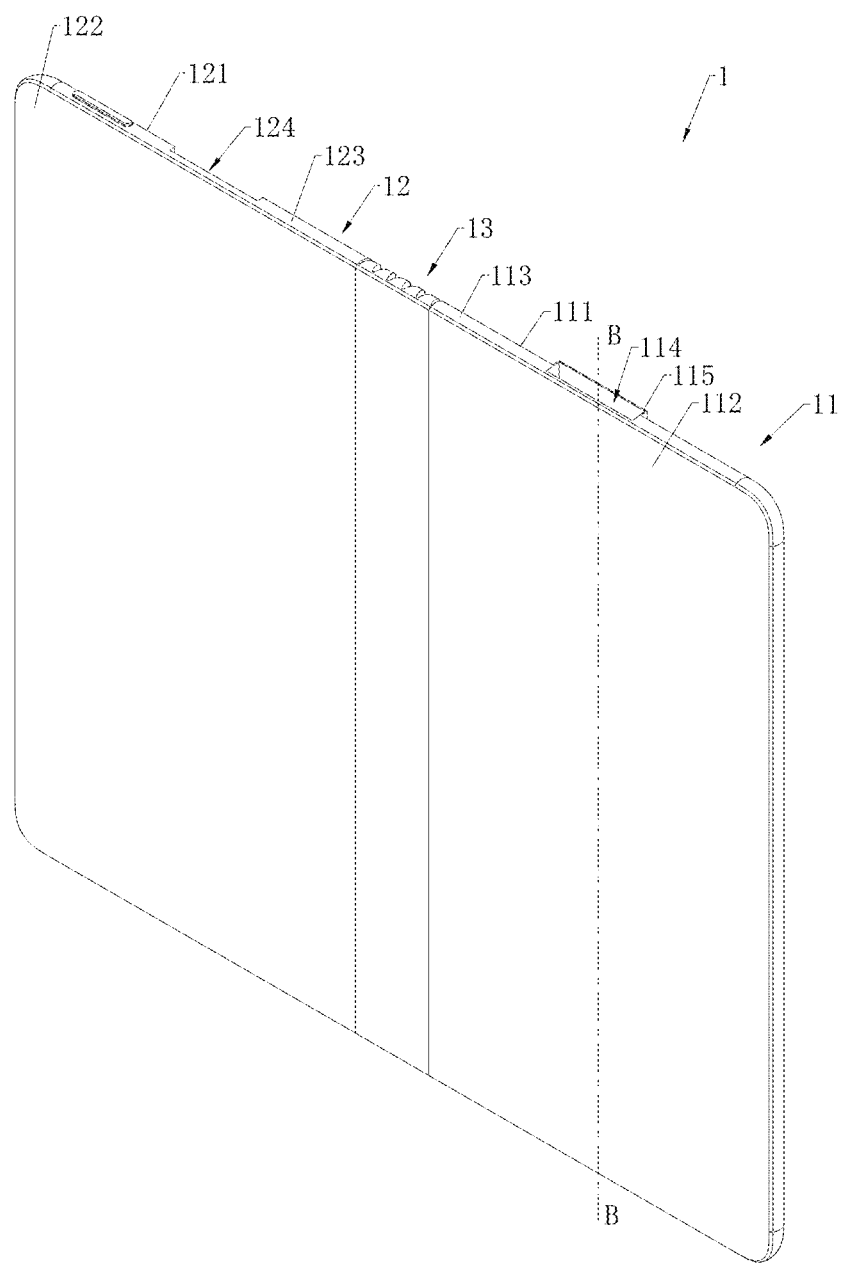
FIG. 3 is a schematic structural view of a support assembly of the mobile terminal of FIG. 1.

Referring to FIG. 2 and FIG. 3 together, the first housing 11 includes a first inner face 111, a first outer face 112, and a first peripheral face 113. The first outer face 112 carries the display screen 2. The first inner face 111 is disposed opposite the first outer face 112. The first peripheral face 113 is connected between the first inner face 111 and the first outer face 112.

Figure 4:
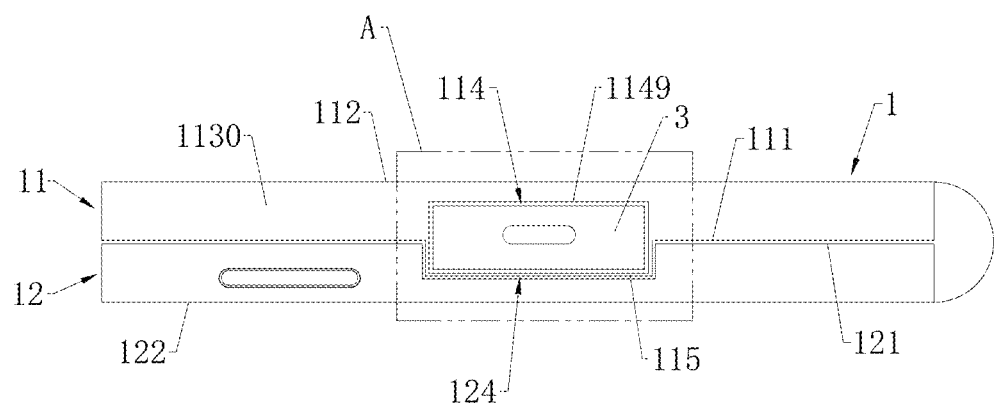
FIG. 4 is a top view of the mobile terminal of FIG. 1.

Referring to FIG. 3 and FIG. 4 together, the first housing 11 is provided with a protrusion 115. The protrusion 115 protrudes from a first inner face 111. The first housing 11 is provided with an accommodation slot 114 therein. The accommodation slot 114 is at least partially defined in the protrusion 115, and the accommodation slot 114 extends from an inside of the first housing 11 to a first peripheral face 113. In other words, the accommodation slot 114 connects the inner side of the first housing 11 and the outer side of the first housing 11, and other components can extend out of or retract into the accommodation slot 114 with respect to the first peripheral face 113.

Figure 7:
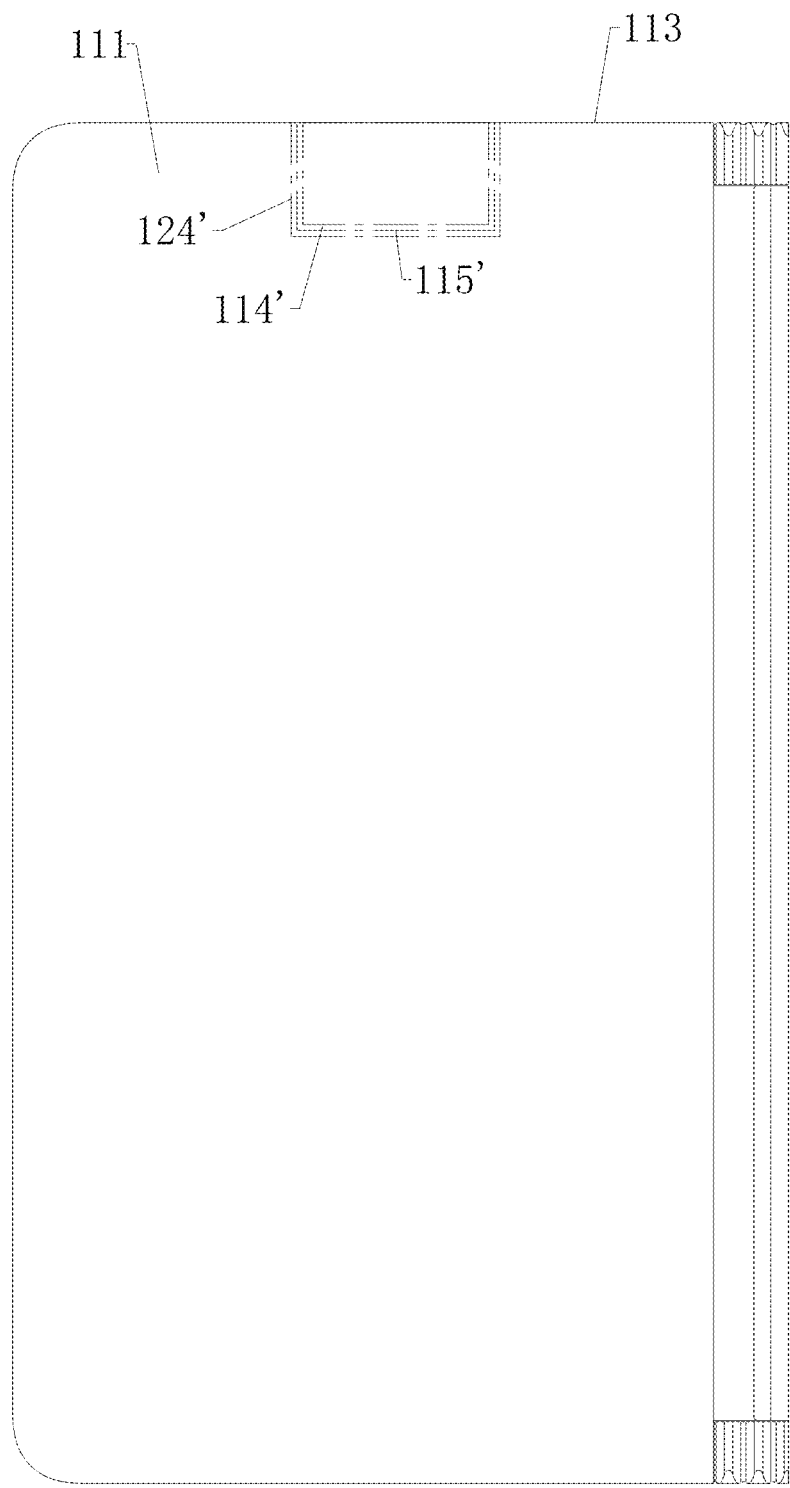
FIG. 7 is a schematic structural view of a part of the mobile terminal of FIG. 1.

Referring to FIG. 1 to FIG. 4 together, a second housing 12 includes a second inner face 121 and a second outer face 122. The second outer face 122 supports the display screen 2. The second inner face 121 and the second outer face 122 are disposed opposite to each other. The second housing 12 is provided with a concave groove 124. The concave groove 124 recesses towards the second outer face 122 from the second inner face 121. When the support assembly 1 is folded, the second inner face 121 and the first inner face 111 are disposed opposite to each other, and at least a part of the protrusion 115 is received within the concave groove 124. Referring to FIG. 7 together, the projection of the concave groove 124 on the first inner face 111 covers the projection of the accommodation slot 114 on the first inner face 111.

Figure 5:
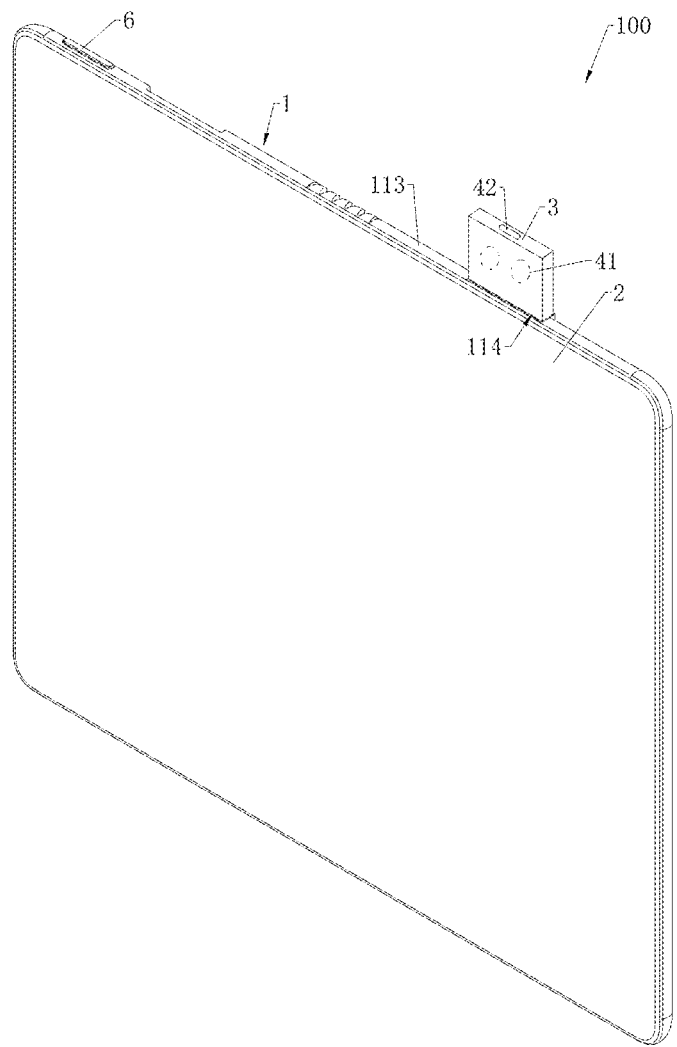
FIG. 5 is another schematic structural view of the mobile terminal of FIG. 1 in a spread state.
Figure 6:
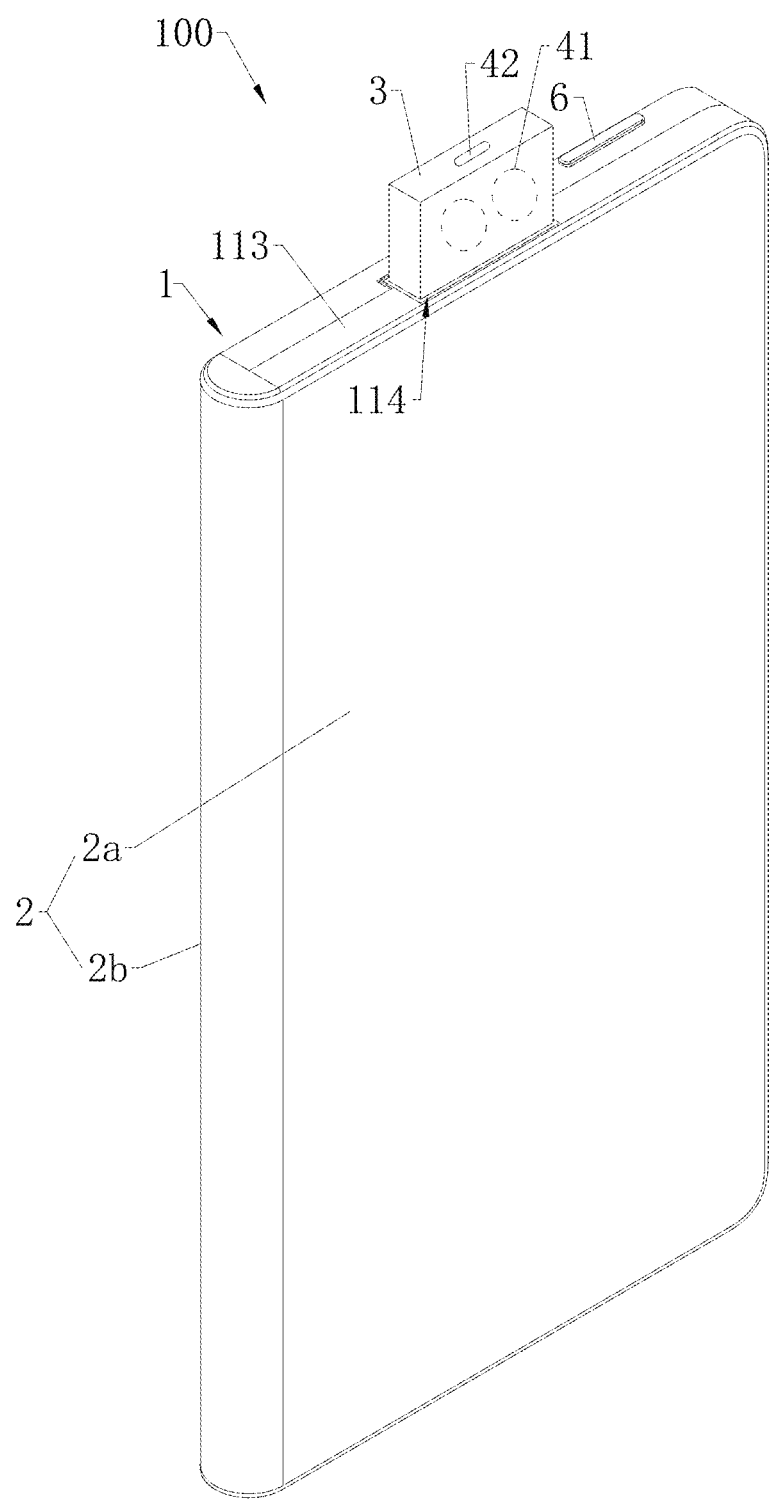
FIG. 6 is another schematic structural view of the mobile terminal of FIG. 1 in a folded state.

Referring to FIG. 5 and FIG. 6 together, the moveable seat 3 is provided with a camera 41 therein. The moveable seat 3 is retractably mounted in the accommodation slot 114. The moveable seat 3 carrying the camera 41 can be received in the accommodation slot 114, or the moveable seat 3 carrying the camera 41 can extend out of the accommodation slot 114 so that an image capturing face of the camera 41 is exposed. When the moveable seat 3 carrying the camera 41 is retracted into the accommodation slot 114 with respect to the first peripheral face 113, the image capturing face of the camera 41 is blocked. When the moveable seat 3 carrying the camera 41 is extended out of the accommodation slot 114 with respect to the first peripheral face 113, the image capturing face of the camera 41 can be exposed. At this point, the camera 41 can capture images.

In this embodiment, because the moveable seat 3 carrying the camera 41 can extend out of or retract into the accommodation slot 114 with respect to the first peripheral face 113, the moveable seat 3 carrying the camera 41 extends out of the accommodation slot 114 for photographing when the camera 41 is required for photographing as shown in FIG. 5 and FIG. 6, and the moveable seat 3 carrying the camera 41 retracts into the accommodation slot 114 when the camera 41 is not required for photographing as shown in FIG. 1 and FIG. 2. Thus, the camera 41 does not need to occupy the space on the first outer face 112 and the second outer face 122 of the mobile terminal 100, and the display screen 2 can be arranged on the first outer face 112 and the second outer face 122 as much as possible, thereby improving the screen-to-body ratio of the mobile terminal 100.

For example, the screen-to-body ratio of the mobile terminal 100 may be up to 85%, or even 95%. The screen-to-body ratio refers to a ratio of a display area of a screen (e.g., the display screen 2) of the mobile terminal 100 to the overall projection area of the mobile terminal on a perpendicular plane in the thickness direction of the mobile terminal 100 when the support component 1 is spread out. In other words, the screen-to-body ratio may also be a ratio of the display screen 2 to the area of the first outer face 112 and the second outer face 122.

Referring to FIG. 2 and FIG. 5 together, when the support assembly 1 is spread out, the whole display screen 2 can display so that the mobile terminal 100 can achieve large-screen displaying. Referring to FIG. 1 and FIG. 6 together, when the support assembly 1 is folded, a part of the display screen 2 that is laid on the first outer face 112 may be selected by the user for displaying, or a part of the display screen 2 that is laid on the second outer face 122 may be selected by the user for displaying, thereby achieving more diversified interaction of the mobile terminal 100, and providing the user with better using experience.

Referring to FIG. 4 and FIG. 6 together, because the protrusion 115 protrudes from the first inner face 111, and the accommodation slot 114 is at least partially defined in the protrusion 115, there is a relatively large space in the thickness direction of the mobile terminal for the accommodation slot 114, and a relatively large thickness can be set for the moveable seat 3 that is retractably mounted in the sliding slide 114 so that the moveable seat 3 can receive elements of relatively large thickness, e.g., the camera 3. Meanwhile, because a part of the protrusion 115 is received in the concave groove 124 when the support assembly 1 is folded, the overall thickness of the mobile terminal 100 is relatively thin when the support assembly 1 is folded, which facilitates the thinner and lighter design of the mobile terminal 100.

Referring to FIG. 6 and FIG. 7 together, because the projection 124' of the concave groove 124 on the first inner face 111 covers the projection 114' of the accommodation slot 114 on the first inner face 111, the protrusion 115 is at least partially received in the concave groove 124 when the support assembly 1 is folded, the moveable seat 3 can smoothly move in the protrusion 115 with respect to the first peripheral face 113, and the wall of the concave groove 124 will not hinder the movement of the moveable seat 3 so that the moveable seat 3 can smoothly extend out of or retract into the accommodation slot 114.

In this embodiment, the camera 41 may be retracted into the mobile terminal 100 when it is not used so as to be protected by the surrounding structure (e.g., the first housing 11 and the second housing 12), and the camera 41 may be extended out of the mobile terminal 100 for photographing when the camera 41 is needed for photographing, thereby preventing the wear of the camera 41 or preventing dust from entering into the camera 41 or the like caused by the long-term exposure, and effectively ensuring the photographing quality of the camera 41.

It shall be appreciated that, as shown in FIG. 5 and FIG. 6, the image capturing face of the camera 41 is used for collecting light so that the camera 41 can achieve the purpose of photographing. "The image capturing face of the camera 41 can be exposed" means that the image capturing face of the camera 41 will not be blocked by a part (e.g., the display screen 2 or the like) of the mobile terminal 100 that can block light so that photographing can be performed smoothly. Of course, the image capturing face of the camera 41 can still allow a transparent lens or the like to be disposed for covering the image capturing face so as to achieve the function of protection.

The accommodation slot 114 may be completely defined in the protrusion 115, or the accommodation slot 114 may be partially defined in the protrusion 115 and partially defined in other parts of the first housing 11. Referring to FIG. 4, in order to make full use of the thickness space of the first housing 11 so as to reduce the overall thickness of the mobile terminal 100, the accommodation slot 114 is partially defined in the protrusion 115 and partially defined in other areas of the first housing 11 that directly face the protrusion 115, and the areas are located between the first inner face 111 and the first outer face 112.

In an embodiment, referring to FIG. 4 together, the first peripheral face 113 includes an open face 1130. An opening 1149 of the accommodation slot 114 is partially formed on the open face 1130. The moveable seat 3 extends out of or retract into the open face 1130 via the opening 1149 of the accommodation slot 114.

Figure 8:
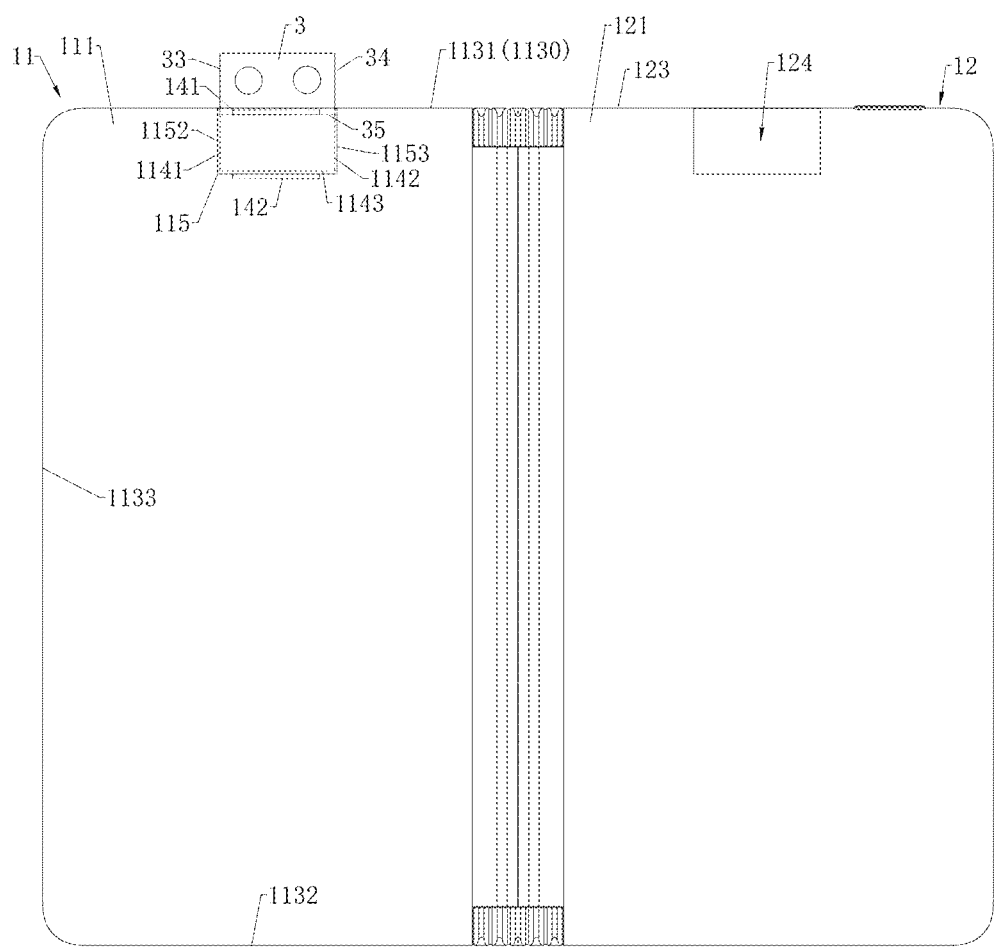
FIG. 8 is a schematic structural view from another angle of view of the mobile terminal of FIG. 1 in a spread state.

Referring to FIG. 4 and FIG. 8 together, the first peripheral face 113 includes a first top side face 1131, a first bottom side face 1132 and a first lateral side face 1133. The first top side face 1131 and the first bottom side face 1132 are disposed opposite to each other. The first lateral side face 1133 is connected between the first top side face 1131 and the first bottom side face 1132. The open face 1130 is one of the first top side face 1131, the first bottom side face 1132 and the first lateral side face 1133. In other words, the moveable seat 3 may extend or retract at the top side, the bottom side or the left and right sides of the mobile terminal 100. This application takes the case where the open face 1130 is the first top side face 1131 as an example for illustration.

Figure 9:
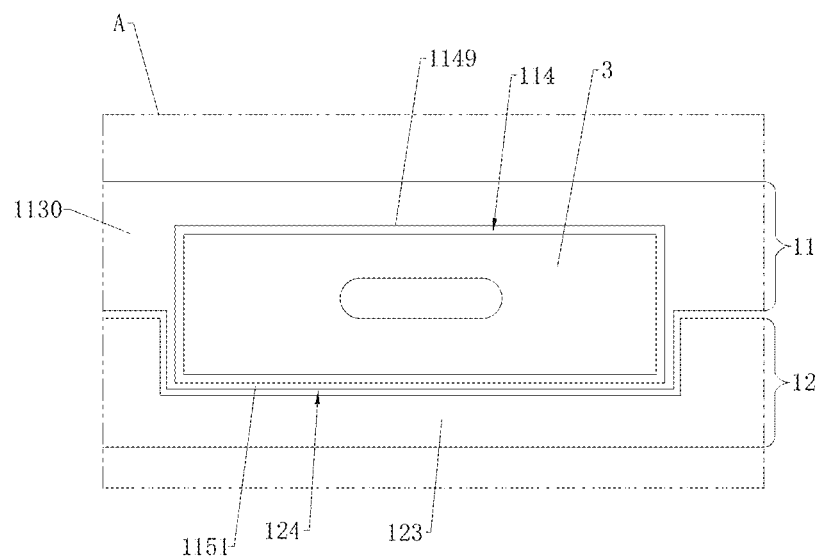
FIG. 9 is a schematic view of an embodiment of a structure at A of FIG. 4.
Figure 10:
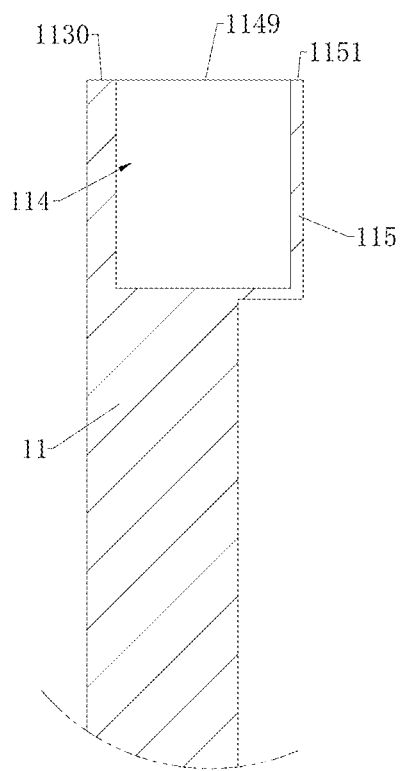
FIG. 10 is a schematic structural view of an embodiment of a structure along a line B-B of FIG. 3.

In an embodiment, referring to FIG. 9 and FIG. 10 together, the protrusion 115 includes a first outer side wall (i.e., a top end face) 1151. The orientation of the first outer side wall 1151 is consistent with the orientation of the open face 1130. The opening 1149 of the accommodation slot 114 is partially formed on the first outer side wall 1151. Because the accommodation slot 114 is partially defined in the protrusion 115, the opening 1149 of the accommodation slot 114 is partially formed on the first outer side wall 1151 in order to make it convenient for the moveable seat 3 to extend or retract in the accommodation slot 114.

The first outer side wall 1151 is level with the open face 1130. In this case, the protrusion 115 is disposed immediately adjacent to the open face 1130, and the moveable seat 3 can enable the camera 41 to extend out of the accommodation slot and extend with respect to the open face 1130 simply by moving for a relatively small distance so that the image capturing face of the camera 41 can be exposed. Moreover, two parts of the opening 1149 of the accommodation slot 114 are level with each other, and when the moveable seat 3 retracts into the accommodation slot 114, the outer face of the moveable seat 3 can be generally level with the open face 1130 and the first outer side wall 1151 so as to generally cover the opening 1149 of the accommodation slot 114. In this way, the appearance uniformity of the mobile terminal 100 can be enhanced and dust or water can be prevented from entering into the mobile terminal 100.

Figure 11:
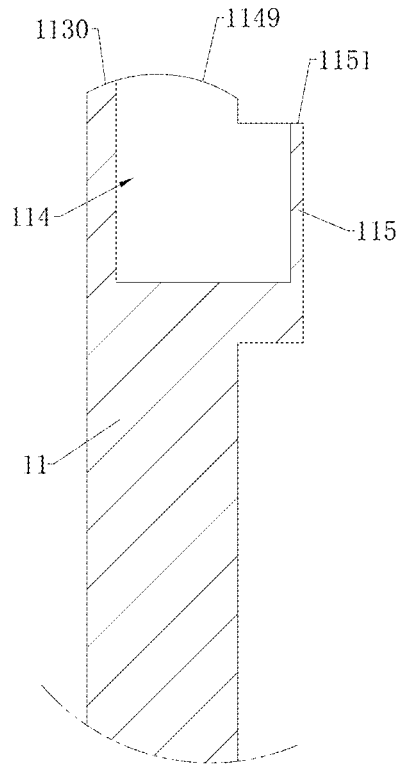
FIG. 11 is a schematic structural view of another embodiment of the structure along the line B-B of FIG. 3.

In other embodiments, referring to FIG. 11, the first outer side wall 1151 and the open face 1130 may also be disposed with an interval therebetween. In this case, there is a certain distance between the protrusion 115 and the open face 1130. The open face 1130 may be disposed as an arc-shaped face to improve the grip feeling of the mobile terminal 100.

In an embodiment, referring to FIG. 3, FIG. 8 and FIG. 9 together, the second housing 12 further includes a second peripheral face 123. The second peripheral face 123 is connected between the second inner face 121 and the second outer face 122. The concave groove 124 recesses towards the second outer face 122 from the second inner face 121. The concave groove 124 extends to the second peripheral face 123. A part of the opening of the concave groove 124 is formed on the second peripheral face 123. Another part of the opening of the concave groove 124 is formed on the second inner face 121, and the two parts of the opening communicate with each other. When the support assembly 1 is folded, the opening of the concave groove 124 is partially overlapped with the opening 1149 of the accommodation slot 114. In this application, the accommodation slot 114 makes full use of the thickness space of the mobile terminal 100, and the second housing 12 achieves the avoidance of the sliding groove 114 through the design of the concave groove 124 so that the moveable seat 3 can smoothly extend or retract within the accommodation slot 114.

In this application, when the support assembly 1 is folded, the first housing 11 and the second housing 12 may be fixed in many ways which are described as follows.

In an embodiment, referring to FIG. 8 and FIG. 9 together, the protrusion 115 further includes a second outer side wall 1152 and a third outer side wall 1153. The second outer side wall 1152 and the third outer side wall 1153 are disposed opposite to each other and are respectively connected with two ends of the first outer side wall 1151. When the protrusion 115 is accommodated within the concave groove 124, the second outer side wall 1152 and the third outer side wall 1153 form interference fit with the wall of the concave groove 124.

In this application, the interference fit between the outer side wall (the second outer side wall 1152 and the third outer side wall 1153) of the protrusion 115 and the wall of the concave groove 124 enables the first housing 11 and the second housing 12 to be fixed with each other when the support assembly 1 is folded. Thus, the fit between the protrusion 115 and the concave groove 124 not only can reduce the overall thickness of the mobile terminal 100, but also can achieve the function of limiting and fixing.

Figure 12:
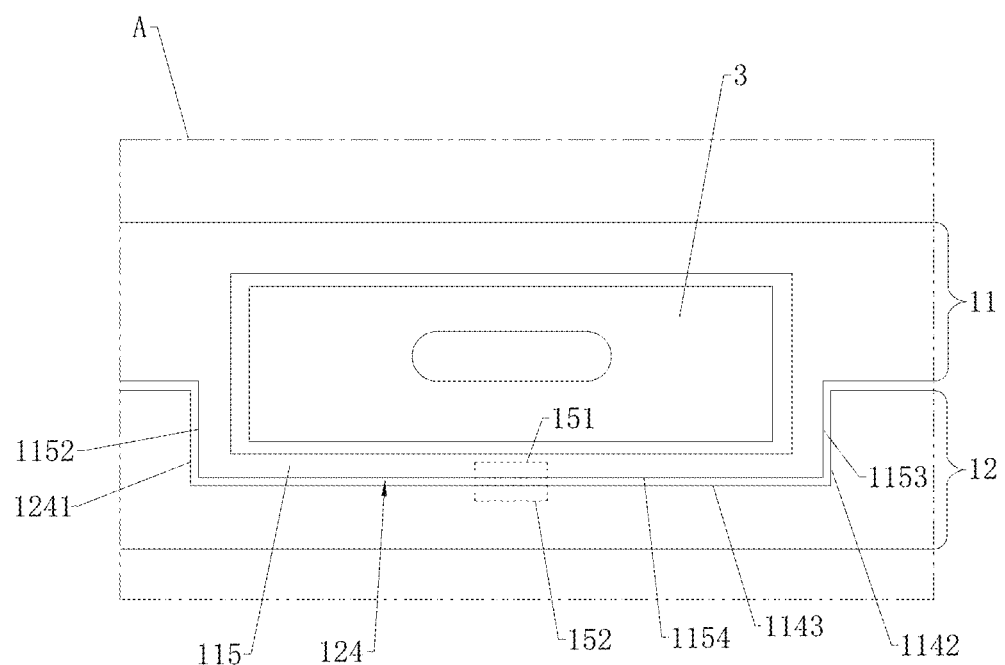
FIG. 12 is a schematic view of another embodiment of the structure at A of FIG. 4.

In another embodiment, referring to FIG. 8 and FIG. 12, the support assembly 1 further includes a first locking member 151 and a second locking member 152. The first locking member 151 is disposed on the first housing 11. The second locking member 152 is disposed on the second housing 12. When the support assembly 1 is folded, the first locking member 151 cooperates with the second locking member 152. The fit between the first locking member 151 and the second locking member 152 enables the first housing 11 and the second housing 12 to be fixed with each other.

Herein, the first locking member 151 is a first permanent magnet. The second locking member 152 is a second permanent magnet. An end of the first permanent magnet and an end of the second permanent magnet, which are facing towards each other, are configured with opposite magnetic poles. When the support assembly 1 is folded, the first permanent magnet and the second permanent magnet are magnetically attracted.

Further, the first locking member 151 is disposed on the outer side wall of the protrusion 115, and the second locking member 152 is disposed on the wall of the concave groove 124. The first locking member 151 may be disposed on at least one side wall of the outer side walls of the protrusion 115, and the second locking member 152 is disposed corresponding to the first locking member 151. For example, the outer side walls of the protrusion 115 include the second outer side wall 1152, the third outer side wall 1153 and a fourth outer side wall 1154 connected with the second outer side wall 1152 and the third outer side wall 1153, and the wall of the concave groove 124 includes a first wall 1241 corresponding to the second outer side wall 1152, a second wall 1242 corresponding to the third outer side wall 1153, and a third wall 1243 corresponding to the fourth outer side wall 1154. The first locking member 151 and the second locking member 152 are disposed in pairs on at least one of the corresponding second outer side wall 1152 and the first wall 1241, the third outer side wall 1153 and the second wall 1242, and the fourth outer side wall 1154 and the third wall 1243. In another embodiment, the first locking member 151 is laid on all the outer side walls of the protrusion 115, the second locking member 152 is laid on all the walls of the concave groove 124 so that the adsorption area between the first locking member 151 and the second locking member 152 is large and the locking force is enhanced. In other embodiments, the first locking member 151 may also be disposed on the first inner face 111, and the second locking member may also be disposed on the second inner face 121.

Figure 13:
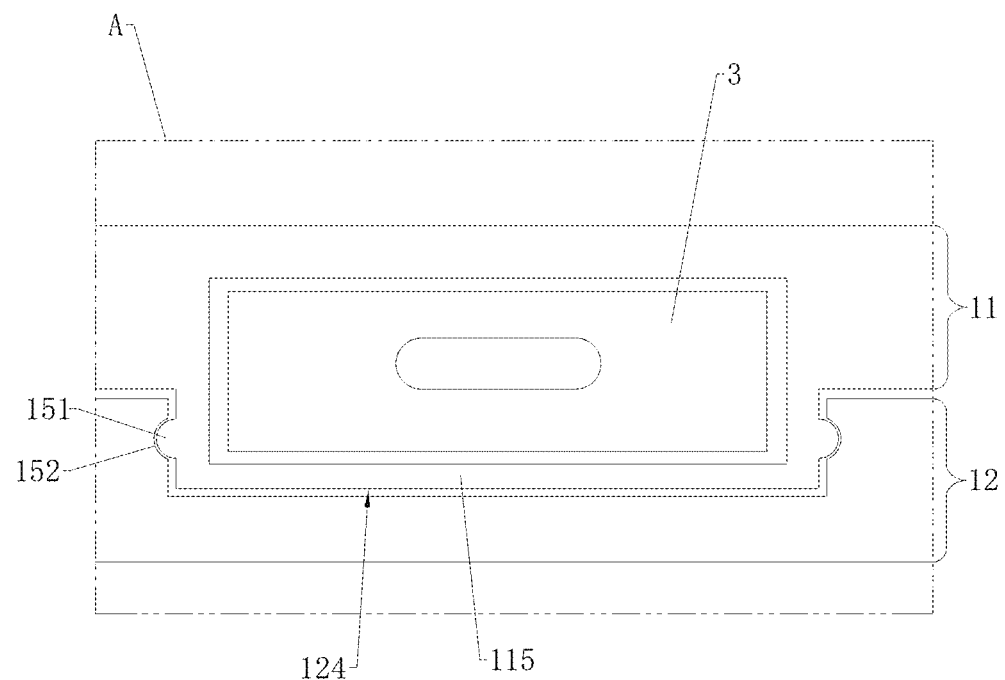
FIG. 13 is a schematic view of a further embodiment of the structure at A of FIG. 4.

In another embodiment, referring to FIG. 13 together, the first locking member 151 is a latching block protruding from the outer side wall of the protrusion 115. The second locking member 152 is a latching groove recessing from the wall of the concave groove 124. When the support assembly 1 is folded, the latching block is engaged with the latching groove. The engagement between the latching block and the latching groove enables the first housing 11 and the second housing 12 to be fixed with each other.

Figure 14:
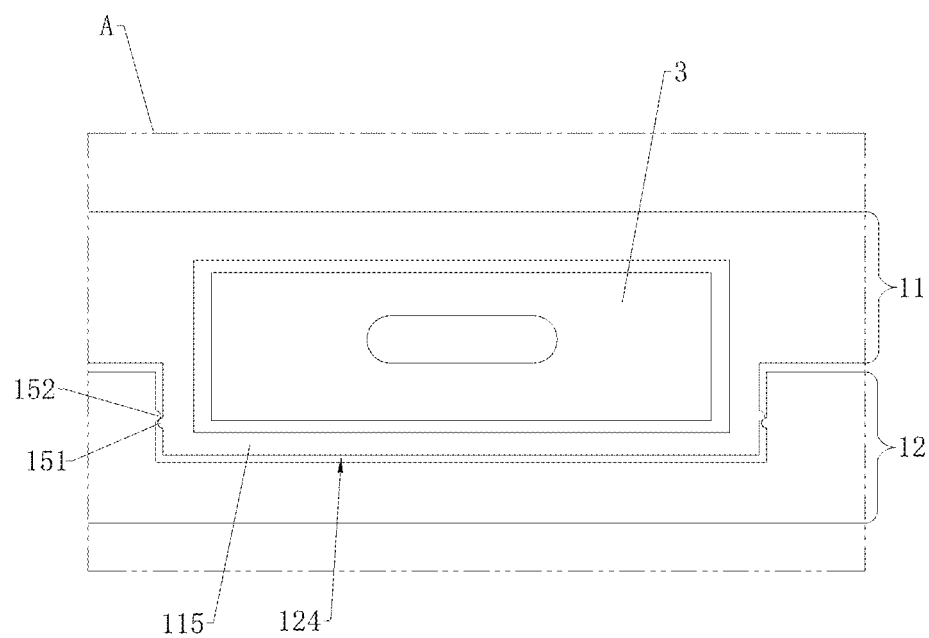
FIG. 14 is a schematic view of yet another embodiment of the structure at A of FIG. 4.

In another embodiment, referring to FIG. 14 together, the first locking member 151 is a first limiting block protruding from the outer side wall of the protrusion 115. The second locking member 152 is a second limiting block protruding from the wall of the concave groove 124. When the support assembly 1 is folded, the first limiting block abuts against the second limiting block. When the first limiting block abuts against the second limiting block, the first housing 11 and the second housing 12 limit positions of each other so as to be fixed with each other.

In this application, the moveable seat 3 may slideably or rotatably extend out of or retract into the accommodation slot 114. For example:

In an embodiment, referring to FIG. 8 together, the accommodation slot 114 includes a first side wall 1141 and a second side wall 1142 disposed opposite to each other. The first side wall 1141 is generally parallel to the second side wall 1142. The moveable seat 3 slideably connects with the first side wall 1141 and the second side wall 1142 so as to slide out of or slide into the accommodation slot 114. Specifically, the moveable seat 3 includes a first outer side wall 33 and a second outer side wall 34 disposed opposite to each other. The first outer side wall 33 slideably connects with the first side wall 1141. The second outer side wall 34 slideably connects with the second side wall 1142.

In this embodiment, the first side wall 1141 and the second side wall 1142 have a guiding function for the moveable seat 3, and the moving direction of the moveable seat 3 is generally consistent with the extending direction of the first side wall 1141 and the second side wall 1142.

The accommodation slot 114 further includes a third side wall 1143. The third side wall 1143 is connected between the first side wall 1141 and the second side wall 1142, and the third side wall 1143 and the open face 1130 are disposed with an interval therebetween. The moveable seat 3 further includes a third outer side wall 35. The third outer side wall 35 is connected between the first outer side wall 33 and the second outer side wall 34. When the moveable seat 3 retracts into the accommodation slot 114, the third outer side wall 35 may abut against the third side wall 1143, and the third side wall 1143 limits the position of the moveable seat 3.

The mobile terminal 100 further includes a first driving assembly. The first driving assembly is configured to drive the moveable seat 3 to slide out of or slide into the accommodation slot 114. A part of the driving assembly is fixedly connected with the moveable seat 3, and a part of the driving assembly is accommodated within the first housing 11. The first driving assembly may be achieved in many ways, and examples of which are described as follows.

Referring to FIG. 8, the first driving assembly includes a permanent magnet 141 and an electromagnet 142. The permanent magnet 141 is fixed on the moveable seat 3. The permanent magnet 141 may be inserted into the third outer side wall 35. The electromagnet 142 is fixed on the first housing 11. The electromagnet 142 may be disposed close to the third side wall 1143, e.g., inserted into the third side wall 1143. When power is supplied to the electromagnet 142, the electromagnet 142 and the permanent magnet 141 are mutually repulsive or attractive so that the moveable seat 3 slides out of or slide into the accommodation slot 114. The electromagnet 142 includes an iron core and a coil winded around the iron core. The magnetic field of the electromagnet 142 is changed by controlling the flowing direction of the current in the coil.

In another embodiment, the first driving assembly includes a slider, a screw rod and a motor. The slider is fixedly connected with the moveable seat 3. The screw rod and the motor are accommodated within the first housing 11. The peripheral side of the screw rod is provided with a spiral groove. The slider is partially inserted into the spiral groove to be slideably connected with the screw rod. The slider may be generally bar-shaped. One end of the slider is fixed on the moveable seat 3, and the other end of the slider is inserted into the spiral groove. The motor is configured to drive the rotation of the screw rod so that the slider carrying the moveable seat 3 slides. For example, when the motor drives the screw rod to rotate towards the first direction, the slider carrying the moveable seat 3 is driven by the screw rod to slide in the direction away from the third side wall 1143 so that the moveable seat 3 extends out of the accommodation slot 114. When the motor drives the screw rod to rotate towards a second direction that is opposite to the first direction, the slider carrying the moveable seat 3 is driven by the screw rod to slide towards the direction approaching the third side wall 1143 so that the moveable seat 3 retracts into the accommodation slot 114. The actions of the motor (including the rotating direction, the rotating speed, the rotating angle or the like) may be adjusted depending on requirements of the user.

In another embodiment, the first driving assembly includes a sleeve, a driving rod and a motor. The sleeve is fixedly connected with the moveable seat 3. The driving rod and the motor are accommodated within the first housing 11. The sleeve is nested at the outer side of the driving rod and connected with the driving rod via thread connection. The sleeve rotates with respect to the driving rod and moves with respect to the first housing 11. The motor is configured to drive the rotation of the driving rod so that the sleeve carrying the base station 3 slides. When the motor drives the driving rod to rotate towards the third direction, the sleeve carrying the moveable seat 3 is driven by the driving rod to slide in the direction away from the third side wall 1143 so that the moveable seat 3 extends out of the accommodation slot 114. When the motor drives the driving rod to rotate towards a fourth direction that is opposite to the third direction, the sleeve carrying the moveable seat 3 is driven by the driving rod to slide towards the direction approaching the third side wall 1143 so that the moveable seat 3 retracts into the accommodation slot 114. The actions of the motor (including the rotating direction, the rotating speed, the rotating angle or the like) may be adjusted depending on requirements of the user.

In another embodiment, the first driving assembly includes a rack, a gear and a motor. The rack is fixedly connected with the moveable seat 3. The gear and the motor are accommodated within the first housing 11. The gear is engaged with the rack. The gear is accommodated within the first housing 11. The motor is accommodated within the first housing 11. The motor is configured to drive the rotation of the gear so that the rack carrying the base station 3 slides. When the motor drives the gear to rotate towards the fifth direction, the rack carrying the moveable seat 3 is driven by the gear to slide in the direction away from the third side wall 1143 so that the moveable seat 3 extends out of the concave slot. When the motor drives the gear to rotate towards a sixth direction that is opposite to the fifth direction, the rack carrying the moveable seat 3 is driven by the gear to slide towards the direction approaching the third side wall 1143 so that the moveable seat 3 retracts into the concave slot. The actions of the motor (including the rotating direction, the rotating speed, the rotating angle or the like) may be adjusted depending on requirements of the user.

There may be multiple groups of first driving assembly, and the multiple groups of first driving assembly are arranged at intervals so as to more stably drive the moveable seat 3.

Figure 15:
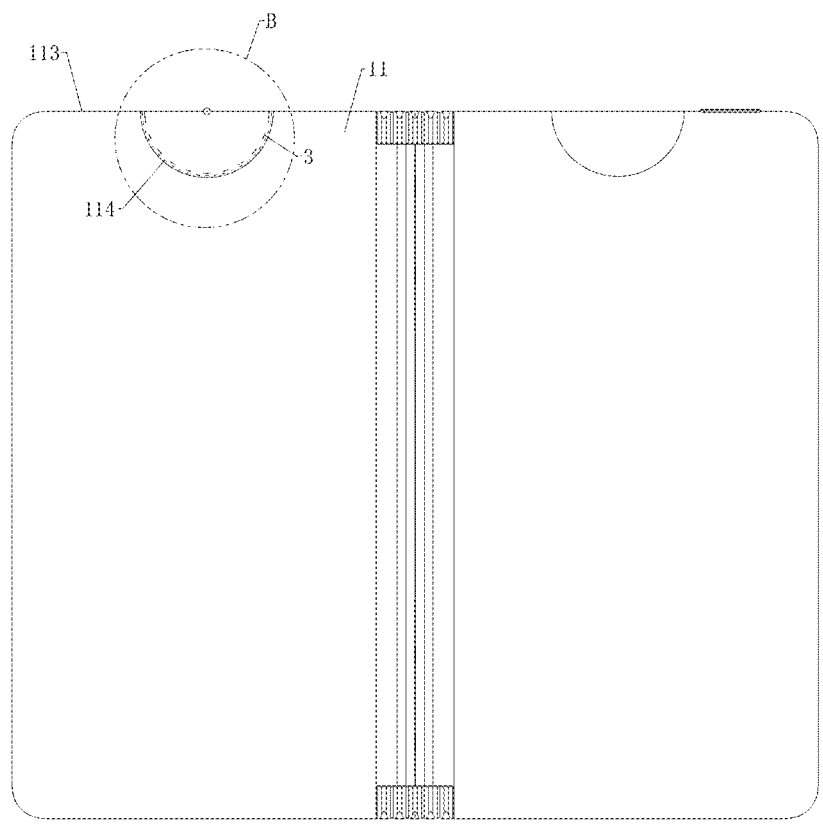
FIG. 15 is a schematic structural view of another embodiment of the mobile terminal provided according to this application.
Figure 16:
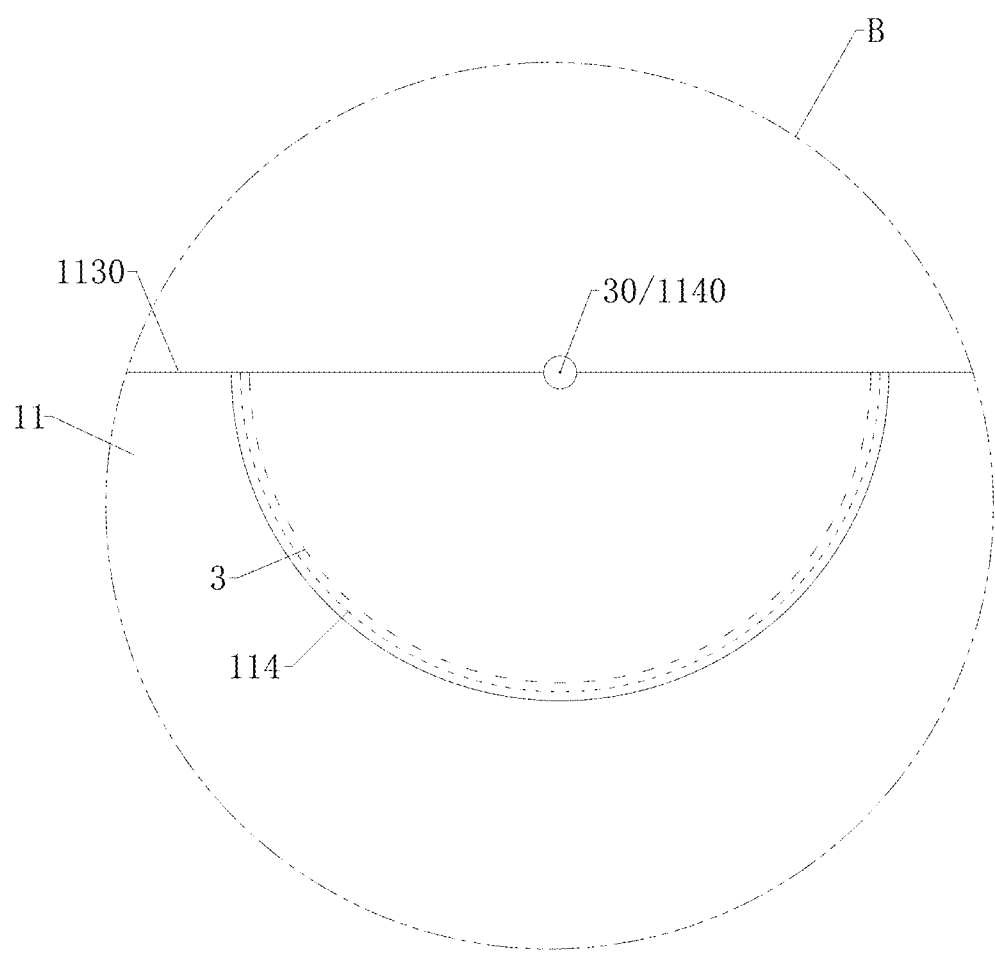
FIG. 16 is an enlarged schematic view of a structure at B of FIG. 12.

In another embodiment, referring to FIG. 15 and FIG. 16 together, the wall of the accommodation slot 114 is arc-shaped. The outer side wall of the moveable seat 3 is arc-shaped. The outer side wall of the moveable seat 3 is disposed opposite to the wall of the accommodation slot 114. The outer side wall of the moveable seat 3 and the wall of the accommodation slot 114 are close to each other and face to each other. The moveable seat 3 rotatably connects with the first housing 11 so as to rotate out of or rotate into the accommodation slot 114.

In this embodiment, the moveable seat 3 rotatably connects with the first housing 11, the trajectory of the wall of the accommodation slot 114 fits with the rotating trajectory of the moveable seat 3. The wall of the accommodation slot 114 is arc-shaped, the outer side wall of the moveable seat 3 is arc-shaped, and these two shapes all fit with the rotating trajectory of the moveable seat 3 so that the moveable seat 3 can smoothly rotate into or rotate out of the accommodation slot 114.

The accommodation slot 114 is semicircular. The moveable seat 3 is semicircular or fan-shaped. A rotating center 30 of the moveable seat 3 coincides with a center of circle 1140 of the accommodation slot 114. In this case, the moveable seat 3 can more smoothly rotate with respect to the first housing 11. When the moveable seat 3 is semicircular, the moveable seat 3 further includes a top side wall connecting the outer side wall. When the moveable seat 3 rotates into the accommodation slot 114, the top side wall is level with the open face 1130 of the first housing 11. When the moveable seat 3 is fan-shaped, the moveable seat 3 further includes a first lateral side wall and a second lateral side wall connecting the first lateral side wall. The first lateral side wall and the second lateral side wall are respectively connected with two ends of the outer side wall of the moveable seat 3. An angle less than 180° is formed between the first lateral side wall and the second lateral side wall.

The mobile terminal 100 further includes a second driving assembly. The second driving assembly is configured to drive the moveable seat 3 to rotate out of or rotate into the accommodation slot 114. The second driving assembly includes a motor, a first gear and a second gear. The motor is configured to drive the rotation of the first gear. The second gear is engaged with the first gear. The second gear is fixed on the rotating shaft of the moveable seat 3, and the rotating center of the second gear coincides with the rotating center of the rotating shaft of the moveable seat 3. The motor drives the moveable seat 3 to rotate around the rotating shaft thereof via the first gear and the second gear so that the moveable seat 3 rotates out of or rotates into the accommodation slot 114.

In an embodiment, referring to FIG. 7 together, the projection 124' of the concave groove 124 on the first inner face 111 completely covers a projection 115' of the protrusion 115 on the first inner face 111 so that the protrusion 115 can smoothly enter into the concave groove 124. The shape of the projection 124' of the concave groove 124 on the first inner face 111 is the same as the shape of the projection 114' of the accommodation slot 114 on the first inner face 111. For example, as shown in FIG. 7, the first shape is rectangular, and the second shape is rectangular. In another embodiment, the first shape is semicircular, and the second shape is semicircular.

In the present application, the display screen 2 can have various implementations, taking examples as follows.

In one embodiment, referring to FIGS. 2 and 3, the display screen 2 is a flexible display screen. The first outer face 112, the outer faces of the bendable member 13 and the second outer face 122 collectively carry the display screen 2. The opposite two sides of the outer face of the bendable member 13 are separately connected to the first outer face 112 and the second outer face 122.

The display screen 2 may be an organic light-emitting diode (OLED) display screen.

Figure 17:
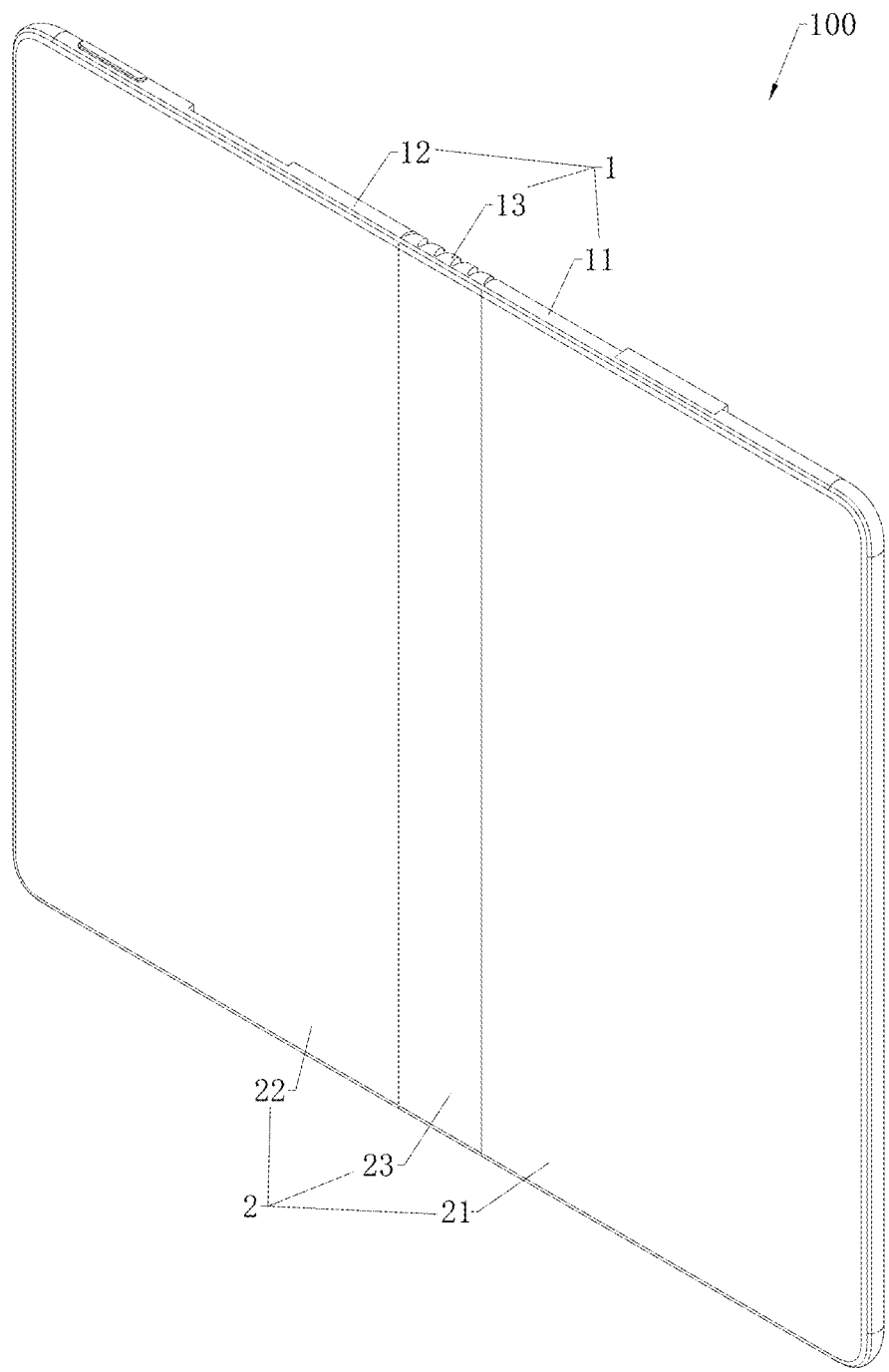
FIG. 17 is a schematic structural view of another embodiment of the mobile terminal provided according to this application.

In another embodiment, referring to FIGS. 3 and 17, the display screen 2 includes a first sub-display screen 21 and a second sub-display screen 22. The first sub-display screen 21 and the second sub-display screen 22 are two display screens that are independent of each other. The first sub-display screen 21 is laid on the first outer face 112. The second sub-display screen 22 is laid on the second outer face 122. The outer face of the bendable member 13 can be laid with a flexible third sub-display 23, which is connected to the first sub-display 21 and the second sub-display 22.

Apparently, in other embodiments, the outer face of the bendable member 13 may not be laid with display screens.

The first sub-display 21 may be a liquid crystal display (LCD) or an organic light-emitting diode (OLED) display. The second sub display 22 may be a liquid crystal display or an organic light emitting diode display. The third sub-display 22 can be an organic light emitting diode display.

In an embodiment, referring to FIGS. 5 and 6, at least one of an iris recognition module, a human face recognition module, a flash light, a microphone (also called a phone transmitter), an earphone 42 (also called a phone receiver), a light sensor, and a fingerprint module may be further disposed in the moveable seat 3. The above functional device (for example, the earphone 42, the light sensor, the fingerprint module, etc.) is disposed in the moveable seat 3 so as to be unfolded relative to the support assembly 11 when needed, and get folded relative to the support assembly 11 when not needed, without taking up the appearance space of the mobile terminal 100, thus providing the display screen 2 with a large displaying area so as to increase the screen ratio of the mobile terminal 100. The functional devices accommodated in the moveable seat 3 can be arranged in a stagger distribution to avoid the thickness of the mobile terminal 100 being too large due to overlapping placement.

The number of the camera 41 in the moveable seat 3 may be one or more. For example, as shown in FIG. 5, the number of the camera 41 is two. The photographing direction of the two cameras 41 may be the same (both of which are front-facing or back-facing) or may be different (one is front-facing and the other is back-facing).

Figure 18:
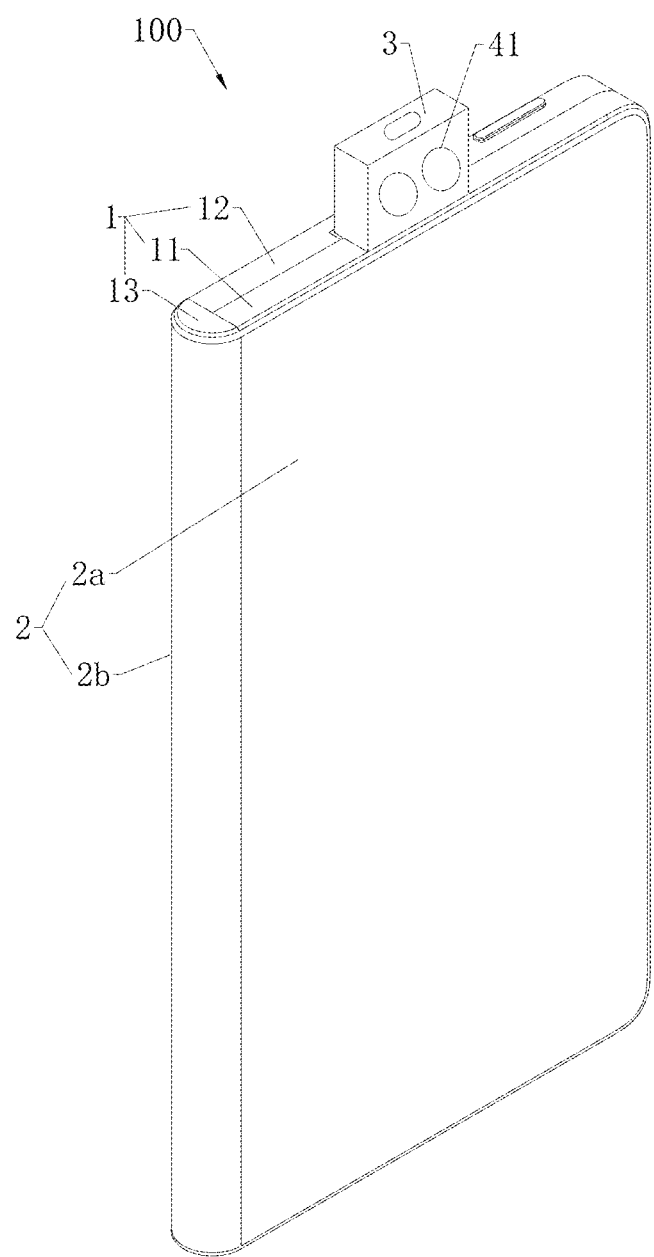
FIG. 18 is a schematic structural view of a further embodiment of the mobile terminal provided according to this application.

In an embodiment, referring to FIG. 3 and FIG. 18 together, the orientation of the image capturing face of the camera 41 is consistent with the orientation of the first outer face 112. In other embodiments, referring to FIG. 3, FIG. 5 and FIG. 6 together, the orientation of the image capturing face of the camera 41 is consistent with the orientation of the first inner face 111.

Figure 19:
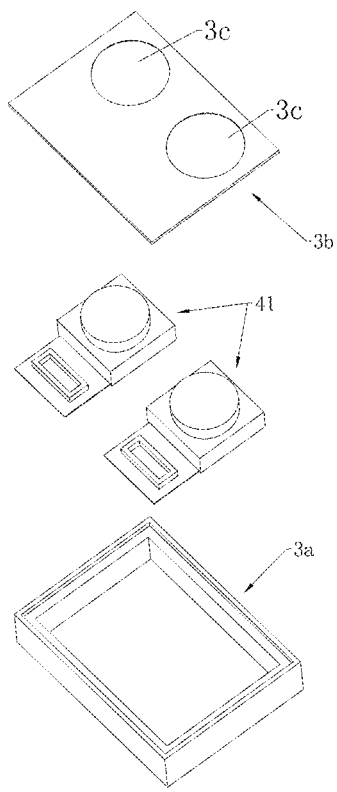
FIG. 19 is a schematic exploded view of a moveable seat and a camera of the mobile terminal of FIG. 1.

Referring to FIG. 19, the moveable seat 3 includes a box 3a and a cover plate 3b. The cover plate 3b covers the box 3a. A receiving space is formed within the moveable seat 3. The camera 41 is accommodated in the receiving space. The cover plate 3b is provided with a signal penetrating region 3c thereon. The signal penetrating region 3c may be a via, and a transparent lens may be inserted in the via. The image capturing face of the camera 41 directly faces the signal penetrating region 3c so as to collect light via the signal penetrating region 3c.

In an embodiment, referring to FIG. 1 and FIG. 2 together, the mobile terminal 100 further includes a controller 5, and the controller 5 is accommodated within the first housing 11 or the second housing 12. The controller 5 is electrically connected with the display screen 2. The controller 5 may also be electrically connected with functional elements received in the moveable seat 3, e.g., the camera 41. The controller 5 is further electrically connected with a first driving assembly or a second driving assembly for driving the movement of the moveable seat 3 so as to control the moveable seat 3 to extend out of or retract into the accommodation slot 114.

In an embodiment, referring to FIG. 1 to FIG. 3 together, the first peripheral face 113 of the first housing 11 or the second peripheral face 123 of the second housing 12 is provided with a triggering key 6 thereon. The triggering key 6 connects (including electrical connection and signal connection) with the controller 5. When the user presses or touches the triggering key 6, the triggering key 6 sends a triggering signal to the controller 5, and the controller 5 controls the first driving assembly or the second driving assembly so that the moveable seat 3 is moved out of or moved into the accommodation slot 114 via the first driving assembly or the second driving assembly when needed. Of course, in other embodiments, both the first peripheral face 113 and the second peripheral face 123 are provided with a triggering key. The triggering signal may be a photographing signal, a photographing end signal, an incoming-call signal, an incoming-call end signal or the like.

In other embodiments, the triggering key may be a touch icon disposed on the display screen 2. When the touch icon is clicked on, a triggering signal can be sent to the controller 5. The controller 5 controls the first driving assembly or the second driving assembly to drive the movement of the moveable seat 3 according to the triggering signal.

Figure 20:
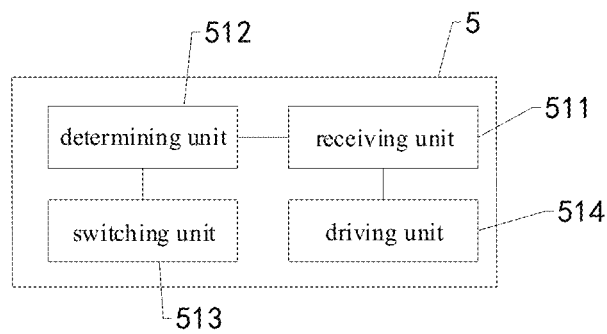
FIG. 20 is a schematic block diagram of a controller of the mobile terminal of FIG. 1.

In an embodiment, referring to FIG. 3, FIG. 6 and FIG. 20 together, the display screen 2 includes a first display region 2a and a second display region 2b. The first display region 2a is overlapped with the first outer face 112. The second display region 2b is overlapped with the second outer face 122. The orientation of the image capturing face of the camera 41 is consistent with that of the first inner face 111. The controller 5 includes a receiving unit 511, a determining unit 512, a switching unit 513 and a driving unit 514.

The receiving unit 511 is configured to receive a photographing signal.

The determining unit 512 is configured to determine whether the photographing signal indicates front-facing photographing or back-facing photographing.

The switching unit 513 is configured to switch the first display region 2a to display the photographing interface of the camera 41 when the photographing signal indicates the back-facing photographing; and is configured to switch the second display region 2b to display the photographing interface of the camera 41 when the photographing signal indicates the front-facing photographing.

The driving unit 514 is configured to drive the movable base 3 carrying the camera 41 to extend out of the accommodation slot 114 according to the photographing signal, and control the camera 41 to capture images.

In this embodiment, the mobile terminal 100 may flexibly switch the photographing interface of the camera 41 depending on photographing requirements of the user, thereby improving the photographing experience of the user.

The receiving unit 511 is further configured to receive a photographing end signal. The driving unit 514 is further configured to drive the moveable seat 3 to retract into the accommodation slot 114 according the photographing end signal, and end the photographing of the camera 41.

Figure 21:
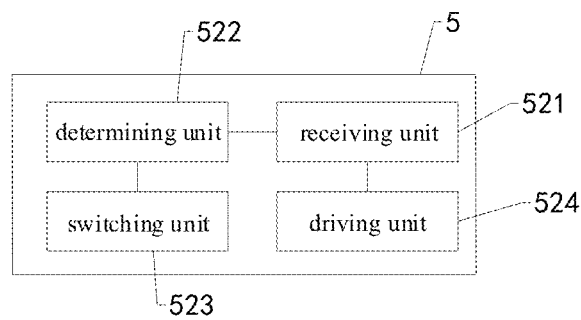
FIG. 21 is a schematic block diagram of a controller of the mobile terminal of FIG. 18.

In another embodiment, referring to FIG. 3, FIG. 18 and FIG. 21 together, the display screen 2 includes a first display region 2a and a second display region 2b. The first display region 2a is overlapped with the first outer face 112. The second display region 2b is overlapped with the second outer face 122. The orientation of the image capturing face of the camera 41 is consistent with that of the first outer face 112. The controller 5 includes a receiving unit 521, a determining unit 522, a switching unit 523 and a driving unit 524.

The receiving unit 521 is configured to receive a photographing signal.

The determining unit 522 is configured to determine whether the photographing signal indicates front-facing photographing or back-facing photographing.

The switching unit 523 is configured to switch the first display region 2a to display the photographing interface of the camera 41 when the photographing signal indicates the front-facing photographing; and is configured to switch the second display region 2b to display the photographing interface of the camera 41 when the photographing signal indicates the back-facing photographing.

The driving unit 524 is configured to drive the movable base 3 carrying the camera 41 to extend out of the accommodation slot 114 according to the photographing signal, and control the camera 41 to capture images.

In this embodiment, the mobile terminal 100 may flexibly switch the photographing interface of the camera 41 depending on photographing requirements of the user, thereby improving the photographing experience of the user.

The receiving unit 521 is further configured to receive a photographing end signal. The driving unit 524 is further configured to drive the moveable seat 3 to retract into the accommodation slot 114 according the photographing end signal, and end the photographing of the camera 41.

The embodiments of the present disclosure have been described in detail above, and the principles and implementations of the present disclosure are described in the specific examples. The description of the above implementations is only used to help understand the method and core spirit of the present disclosure. In the meantime, one with ordinary skills in the art may obtain modifications on the specific embodiments and the application range according to the spirit of the present disclosure. In a word, the description shall not be considered as a limit to the present disclosure.

What is claimed is:

1. A mobile terminal, comprising a support assembly, a display screen, and a moveable seat; wherein, the support assembly comprises a first housing, a second housing, and a bendable member; the bendable member is connected between the first housing and the second housing, the bendable member is capable of being spread or bent so as to spread out or fold the support assembly;

the first housing comprises a first inner face, a first outer face and a first peripheral face; the first outer face supports a part of the display screen, the first inner face is disposed opposite to the first outer face, the first peripheral face is connected between the first inner face and the first outer face, the first housing is provided with a protrusion, the protrusion protrudes from the first inner face, the first housing defines an accommodation slot therein, the accommodation slot is at least partially defined in the protrusion, and the accommodation slot extends from an inside of the first housing to the first peripheral face;

the second housing comprises a second inner face and a second outer face, the second outer face supports the other part of the display screen, the second inner face is disposed opposite to the second outer face, the second housing is provided with a concave groove; when the support assembly is folded, the second inner face is disposed opposite to the first inner face, at least a part of the protrusion is accommodated within the concave groove, and a projection of the concave groove on the first inner face covers a projection of the accommodation slot on the first inner face; and a camera is disposed in the moveable seat, the moveable seat is retractably mounted in the accommodation slot, and the moveable seat carrying the camera is configured to be received within the accommodation slot or extended out of the accommodation slot so that an image capturing face of the camera is exposed.

2. The mobile terminal of claim 1, wherein the first peripheral face comprises an open face, an opening of the accommodation slot is partially formed on the open face, and the moveable seat is extended out of or retracted into the open face via the opening of the accommodation slot;

the first peripheral face comprises a first top side face, a first bottom side face and a first lateral side face, the first top side face is disposed opposite to the first bottom side face, the first lateral side face is connected between the first top side face and the first bottom side face, and the open face is one of the first top side face, the first bottom side face and the first lateral side face.

3. The mobile terminal of claim 2, wherein the protrusion comprises a first outer side wall, an orientation of the first outer side wall is consistent with an orientation of the open face, and the opening of the accommodation slot is partially formed on the first outer side wall.

4. The mobile terminal of claim 3, wherein the first outer side wall is level with the open face, or the first outer side wall and the open face are disposed with an interval therebetween.

5. The mobile terminal of claim 2, wherein the second housing further comprises a second peripheral face, the second peripheral face is connected between the second inner face and the second outer face, the concave groove extends to the second peripheral face, a part of the opening of the concave groove is formed on the second peripheral face; and when the support assembly is folded, the opening of the concave groove is partially overlapped with the opening of the accommodation slot.

6. The mobile terminal of claim 3, wherein the protrusion further comprises a second outer side wall and a third outer side wall, the second outer side wall and the third outer side wall are disposed opposite to each other and are respectively connected with two ends of the first outer side wall; and when the protrusion is accommodated within the concave groove, the second outer side wall and the third outer side wall form interference fit with a wall of the concave groove.

7. The mobile terminal of claim 1, wherein the support assembly further comprises a first locking member and a second locking member, the first locking member is disposed on the first housing, the second locking member is disposed on the second housing; and when the support assembly is folded, the first locking member cooperates with the second locking member.

8. The mobile terminal of claim 7, wherein the first locking member is a first permanent magnet, the second locking member is a second permanent magnet; and when the support assembly is folded, the first permanent magnet and the second permanent magnet are magnetically attractive to each other.

9. The mobile terminal of claim 7, wherein the first locking member is a latching block protruding from an outer side wall of the protrusion, the second locking member is a latching groove recessing from the wall of the concave groove; and when the support assembly is folded, the latching block is engaged with the latching groove.

10. The mobile terminal of claim 7, wherein the first locking member is a first limiting block protruding from an outer side wall of the protrusion, the second locking member is a second limiting block protruding from the wall of the concave groove; and when the support assembly is folded, the first limiting block abuts against the second limiting block.

11. The mobile terminal of claim 1, wherein the accommodation slot comprises a first side wall and a second side wall disposed opposite to each other, and the moveable seat slideably connects with the first side wall and the second side wall so as to slide out of or slide into the accommodation slot.

12. The mobile terminal of claim 1, wherein a wall of the accommodation slot is arc-shaped, an outer side wall of moveable seat is arc-shaped, the outer side wall of the moveable seat is disposed opposite to the wall of the accommodation slot, and the moveable seat is rotatably connected to the first housing to rotate out of or rotate into the accommodation slot.

13. The mobile terminal of claim 1, wherein the moveable seat is further provided with at least one of an iris recognition module, a human face recognition module, a flash light, a microphone, an earphone, a light sensor, and a fingerprint module.

14. The mobile terminal of claim 1, wherein the display screen is a flexible display screen; and the first outer face, an outer face of the bendable member and the second outer face together support the display screen.

15. The mobile terminal of claim 1, wherein the display screen comprises a first sub-display screen and a second sub-display screen, the first sub-display screen is laid on the first outer face, and the second sub-display screen is laid on the second outer face.

16. The mobile terminal of claim 1, wherein an orientation of the image capturing face of the camera is consistent with that of the first outer face, or the orientation of the image capturing face of the camera is consistent with that of the first inner face.

17. The mobile terminal of claim 1, wherein the display screen comprises a first display region and a second display region, the first display region is overlapped with the first outer face, the second display region is overlapped with the second outer face; an orientation of the image capturing face of the camera is consistent with that of the first inner face, the mobile terminal further comprises a controller, the controller is accommodated within the first housing or the second housing, and the controller comprises:

a receiving unit, being configured to receive a photographing signal;

a determining unit, being configured to determine whether the photographing signal indicates front-facing photographing or back-facing photographing;

a switching unit, being configured to switch the first display region to display the photographing interface of the camera when the photographing signal indicates the back-facing photographing; and being configured to switch the second display region to display the photographing interface of the camera when the photographing signal indicates the front-facing photographing; and a driving unit, being configured to drive the moveable seat carrying the camera to extend out of the accommodation slot according to the photographing signal, and control the camera to capture images.

18. The mobile terminal of claim 1, wherein the display screen comprises a first display region and a second display region, the first display region is overlapped with the first outer face, the second display region is overlapped with the second outer face; an orientation of the image capturing face of the camera is consistent with that of the first outer face, the mobile terminal further comprises a controller, the controller is accommodated within the first housing or the second housing, and the controller comprises:

a receiving unit, being configured to receive a photographing signal;

a determining unit, being configured to determine whether the photographing signal indicates front-facing photographing or back-facing photographing;

a switching unit, being configured to switch the first display region to display the photographing interface of the camera when the photographing signal indicates the front-facing photographing; and being configured to switch the second display region to display the photographing interface of the camera when the photographing signal indicates the back-facing photographing; and a driving unit, being configured to drive the moveable seat carrying the camera to extend out of the accommodation slot according to the photographing signal, and control the camera to capture images.

19. A mobile terminal, comprising a support assembly, a display screen, and a moveable seat; wherein, the support assembly comprises a first housing, a second housing, and a bendable member; the bendable member is connected between the first housing and the second housing;

the first housing comprises a first inner face, a first outer face and a first top face; the first outer face partially supports a part of the display screen, the first inner face is disposed opposite to the first outer face, the first top face is connected between the first inner face and the first outer face, the first housing is provided with a protrusion, the protrusion protrudes from the first inner face, the first housing defines an accommodation space therein, the accommodation space is at least partially defined in the protrusion, and the accommodation space extends from an inside of the first housing to the first top face;

the second housing comprises a second inner face and a second outer face, the second outer face partially supports the other part of the display screen, the second inner face is disposed opposite to the second outer face, the second housing is provided with a concave groove; when bendable member is bent to fold the support assembly, the second inner face is disposed opposite to the first inner face, at least a part of the protrusion is accommodated within the concave groove; and a camera is carried by the moveable seat, the moveable seat is retractably mounted in the accommodation space, and the moveable seat carrying the camera is configured to be received within the accommodation space or extended out of the accommodation space so that an image capturing face of the camera is exposed.

20. A mobile terminal, comprising a support assembly, a display screen, and a moveable seat; wherein, the support assembly comprises a first housing, a second housing, and a bendable member; the bendable member is connected between the first housing and the second housing, the first housing supports a part of the display screen, and the second housing supports the other part of the display screen;

the first housing is provided with a protrusion, the first housing defines an accommodation slot therein, and the accommodation slot is at least partially defined in the protrusion;

the second housing is provided with a concave groove; when the support assembly is folded, at least a part of the protrusion is accommodated within the concave groove; and a camera is disposed in the moveable seat, the moveable seat is retractably mounted in the accommodation slot, and the moveable seat carrying the camera is configured to be received within the accommodation slot or extended out of the accommodation slot so that an image capturing face of the camera is exposed.

* * * * *